(12) United States Patent
Sandey et al.

(10) Patent No.: US 11,213,846 B1
(45) Date of Patent: Jan. 4, 2022

(54) SYSTEMS AND METHODS FOR A PRODUCT SYSTEM OF AN AGRICULTURAL APPLICATOR

(71) Applicant: CNH Industrial America LLC, New Holland, PA (US)

(72) Inventors: Mitchell Sandey, Benson, MN (US); Scott Allen Long, Plainfield, IL (US); Nathan Paul Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/236,617

(22) Filed: Apr. 21, 2021

Related U.S. Application Data

(60) Provisional application No. 63/151,921, filed on Feb. 22, 2021.

(51) Int. Cl.
*B05B 14/00* (2018.01)
*B67D 7/36* (2010.01)
*B67D 7/02* (2010.01)

(52) U.S. Cl.
CPC ............... *B05B 14/00* (2018.02); *B67D 7/02* (2013.01); *B67D 7/36* (2013.01)

(58) Field of Classification Search
CPC .............. B67D 7/02; B67D 7/36; B05B 14/00
See application file for complete search history.

(56) References Cited

U.S. PATENT DOCUMENTS

| | | | |
|---|---|---|---|
| 3,976,087 A | 8/1976 | Bolton et al. | |
| 4,052,003 A | 10/1977 | Steffen | |
| 4,139,156 A | 2/1979 | Field et al. | |
| 4,168,798 A | 9/1979 | Moore et al. | |
| 4,392,611 A | 7/1983 | Bachman et al. | |

(Continued)

FOREIGN PATENT DOCUMENTS

| | | |
|---|---|---|
| GB | 2580034 A | 7/2020 |
| WO | WO 2001/095714 | 12/2001 |
| WO | WO 2020/239763 | 12/2020 |

OTHER PUBLICATIONS

Deere & Company, "New PowrSpray for High Specification Sprayers", dated Feb. 24, 2021. (7 Pages) https://www.deere.co.uk/en/agriculture/sprayers/powrspray/.

(Continued)

*Primary Examiner* — Jason K Niesz

(74) *Attorney, Agent, or Firm* — Rebecca L. Henkel; Rickard K. DeMille

(57) ABSTRACT

A product system for an agricultural sprayer includes a product tank configured to store an agricultural product. A reclaim system can be configured to provide the agricultural product within a flow assembly to a product tank. A computing system can be communicatively coupled to the reclaim system. The computing system can be configured to receive information indicative of one or more characteristics of the agricultural product inputted into the fill station during a fill mode; detect termination of the fill mode; and activate a reclaim mode to move the agricultural product from the flow assembly to the product tank through activation of the reclaim system, wherein one or more operating conditions of the reclaim mode are based on the one or more characteristics of the agricultural product.

20 Claims, 14 Drawing Sheets

(56) References Cited

U.S. PATENT DOCUMENTS

| | | |
|---|---|---|
| 5,836,321 A | 11/1998 | Kaneski et al. |
| 5,911,362 A | 6/1999 | Wood et al. |
| 6,122,581 A | 9/2000 | McQuinn |
| 6,536,683 B1 | 3/2003 | Filicicchia et al. |
| 6,678,580 B2 | 1/2004 | Benneweis |
| 7,857,237 B2 | 12/2010 | Vickers et al. |
| 8,191,798 B2 | 6/2012 | Hahn et al. |
| 8,523,085 B2 | 9/2013 | Grimm et al. |
| 9,504,212 B2 | 11/2016 | Michael et al. |
| 9,554,506 B2 | 1/2017 | Bittner et al. |
| 9,661,809 B2 | 5/2017 | Chiocco et al. |
| 9,781,916 B2 | 10/2017 | Preheim et al. |
| 10,225,979 B2 | 3/2019 | Trask |
| 10,334,776 B2 | 7/2019 | Petrus et al. |
| 10,369,585 B2 | 8/2019 | Brooks et al. |
| 10,631,531 B2 | 4/2020 | Engelbrecht et al. |
| 10,788,419 B2 | 9/2020 | Thompson |
| 2008/0128528 A1 | 6/2008 | Alongi et al. |
| 2009/0099737 A1 | 4/2009 | Wendte et al. |
| 2013/0140375 A1 | 6/2013 | Easton et al. |
| 2013/0320105 A1* | 12/2013 | Schmidt ............... A01G 25/16 239/1 |
| 2014/0252111 A1* | 9/2014 | Michael ............... A01M 7/0089 239/11 |
| 2016/0044862 A1 | 2/2016 | Kocer |
| 2016/0054281 A1* | 2/2016 | Smeeton ............... G01N 21/33 250/373 |
| 2020/0406281 A1 | 12/2020 | Funseth et al. |

OTHER PUBLICATIONS

Wolf, "Recirculating Booms—Introduction to the Concept", Sprayers101 dated Jan. 22, 2019 (11 Pages) https://sprayers101.com/recirculating-boom/.

Alliance AG Equipment, "RoGator C-Series Recovery System", YouTube, dated Mar. 14, 2018, (1 Page—00:05:17 video) https://www.youtube.com/watch?v=in-voQMT8uc.

* cited by examiner

US 11,213,846 B1

SYSTEMS AND METHODS FOR A PRODUCT SYSTEM OF AN AGRICULTURAL APPLICATOR

CROSS-REFERENCE TO RELATED APPLICATIONS

This application is a non-provisional application claiming the benefit of priority under 35 U.S.C. § 119(e) to U.S. Provisional Application No. 63/151,921, filed Feb. 22, 2021, which is hereby incorporated by reference in its entirety.

FIELD

The present disclosure generally relates to agricultural sprayers for performing spraying operations within a field and, more particularly, to a product system for a sprayer.

BACKGROUND

Agricultural applicators or sprayers have been used within the industry for delivering an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s). Typically, an applicator or sprayer is pulled as an implement or is self-propelled, and includes a tank, a pump, a boom assembly, and a plurality of nozzles carried by the boom assembly at spaced-apart locations. The boom assembly can include a pair of boom arms, with each boom arm extending to either side of the sprayer when in an unfolded state. Each boom arm may include multiple boom sections, each with a number of spray nozzles (also sometimes referred to as spray tips).

In preparation for a spray operation, an agricultural product is loaded into a product system of the sprayer. For example, the agricultural product can be moved from an off-board source to a product tank of the sprayer. The agricultural product may be transferred from the product tank to the field as the sprayer traverses the field. Unfortunately, transferring the agricultural product from the off-board source to the product system can be inefficient and/or alter the agricultural product.

Accordingly, an improved product system and methods that actuates a reclaim system of the sprayer based on the characteristics of the agricultural product would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to a product system for an agricultural sprayer. The system includes a product tank configured to store an agricultural product. An application line fluidly is coupled with the product tank and is configured to deliver the agricultural product from the product tank to a nozzle assembly. A fill station is configured to accept the agricultural product from an off-board source. A flow assembly is fluidly coupled with the fill station and is configured to direct the agricultural product into the product tank. A reclaim system is configured to provide the agricultural product within the flow assembly to the product tank. A computing system is communicatively coupled to the reclaim system. The computing system is configured to receive information indicative of one or more characteristics of the agricultural product inputted into the fill station during a fill mode; detect, through the computing system, termination of the fill mode; and activate, through the computing system, a reclaim mode to move the agricultural product from the flow assembly to the product tank through activation of the reclaim system, wherein one or more operating conditions of the reclaim mode are based on the one or more characteristics of the agricultural product.

In some aspects, the present subject matter is directed to a method for operation of a product system for an agricultural sprayer. The method includes determining one or more characteristics of an agricultural product, wherein at least a portion of the agricultural product is positioned within a flow assembly fluidly coupled with a product tank. The method also includes activating a reclaim system for a first defined time period to move the agricultural product within the flow assembly to the product tank based on the one or more characteristics of the agricultural product.

In some aspects, the present subject matter is directed to a product system for an agricultural sprayer. The system includes a product tank configured to store an agricultural product. A flow assembly is configured to direct the agricultural product into the product tank during a fill mode. A sensor is configured to detect a characteristic of the agricultural product. A reclaim system is configured to provide the agricultural product within the flow assembly to the product tank during a reclaim mode. A computing system is communicatively coupled to the sensor. The computing system is configured to alter a predefined pressure provided by the reclaim system to the flow assembly during a reclaim mode based on the characteristic of the agricultural product.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
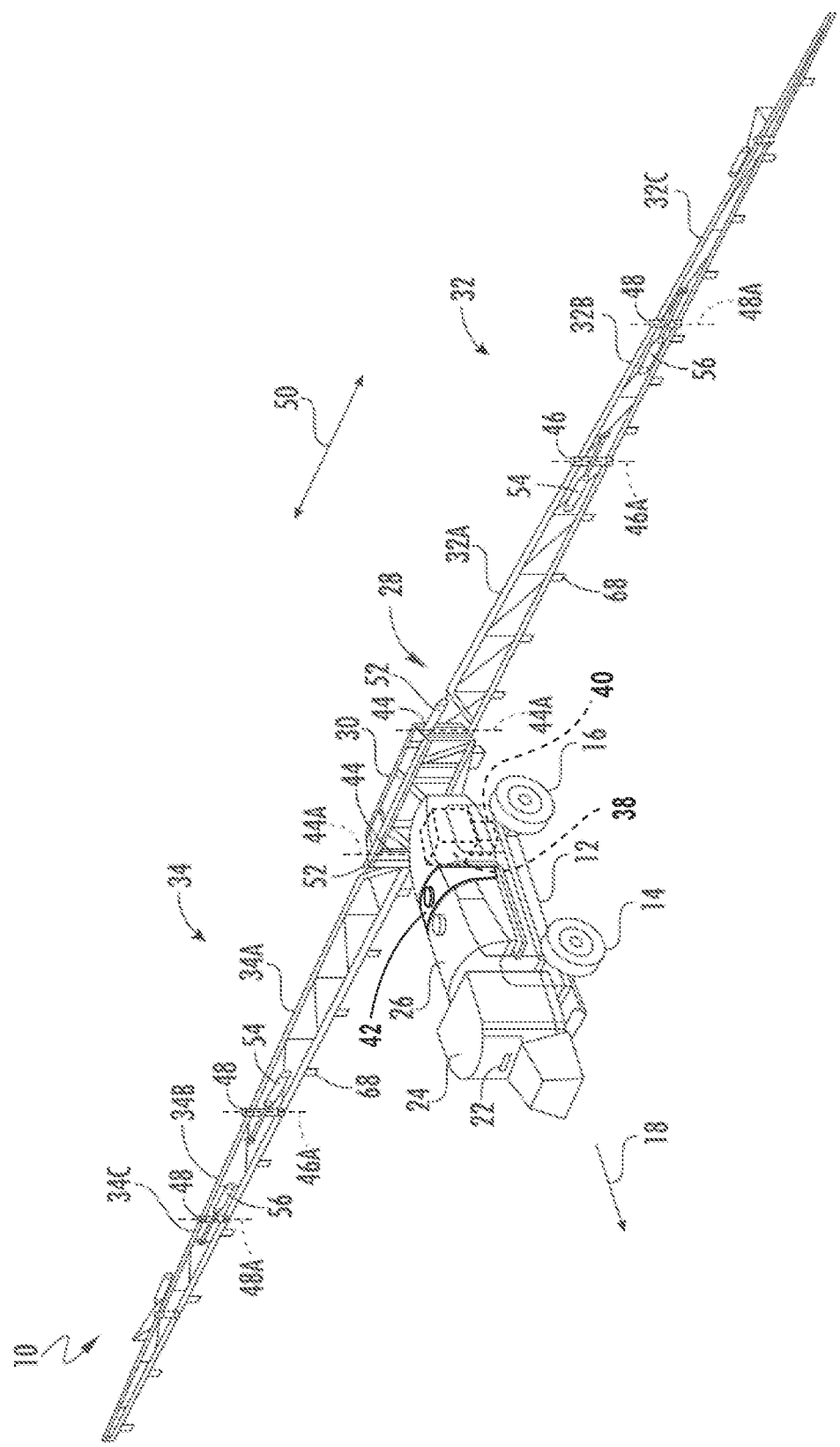
FIG. 1 illustrates a perspective view of an agricultural sprayer in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to an agricultural product within a fluid circuit. For example, "upstream" refers to the direction from which an agricultural product flows, and "downstream" refers to the direction to which the agricultural product moves. The term "selectively" refers to a component's ability to operate in various states (e.g., an ON state and an OFF state) based on manual and/or automatic control of the component.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to a product system for an agricultural sprayer. The product system can include a product tank configured to store a volume of an agricultural product. An application line is fluidly coupled with the product tank and configured to deliver the agricultural product from the product tank to one or more nozzle assemblies during an application mode. In some instances, the one or more nozzle assemblies can be mounted on a boom assembly and configured to selectively dispense the agricultural product stored in the associated product tank via the nozzle assemblies onto underlying plants and/or soil.

In various embodiments, the product system further includes a fill station configured to accept the agricultural product from an off-board source during a fill mode. A flow assembly is operably coupled with the fill station and configured to direct the agricultural product into the product tank. The flow assembly can include a conduit operably coupled with the fill station. The conduit may be fluidly coupled with a product circuit and/or a product tank on an opposing side thereof.

Upon completion of the fill mode (or any other time), a residual volume of the agricultural product may remain within the flow assembly. To move the residual volume of the agricultural product to the product tank, a reclaim system may be actuated during a reclaim mode of the product system. In various examples, the reclaim system may include a movement device that causes the agricultural product to be moved from at least the conduit to the product tank. In various embodiments, the movement device may be configured as a pump, a blower, a compressors, a fan, and/or any other practicable device.

In some instances, a computing system may be communicatively coupled to the reclaim system. The computing system may be configured to receive information indicative of one or more characteristics of the agricultural product inputted into the fill station during a fill mode. The computing system may also be configured to detect a termination of the fill mode. Further, the computing system may be configured to activate a reclaim mode to move the agricultural product from the flow assembly to the product tank through activation of the reclaim system. In various instances, one or more operating conditions of the reclaim mode are based on the one or more characteristics of the agricultural product. The operating conditions may include a pressure provided to the flow assembly during a reclaim mode, a predefined time period for activation, and/or any other operating condition of the reclaim system.

In various instances, the information may be provided in the form of data from the one or more tank sensors 168, the one or more flow path sensors 172, and/or any other component of the sprayer system. Additionally or alternatively, the information may be provided in the form of data inputted through the user interface and/or a remote electronic device. Upon termination of the fill mode, predefined algorithms, look-up tables, charts, graphs, etc. may be established to determine each operating condition of the reclaim process based on the one or more characteristics of the agricultural product, which may include, but are not limited to, a density, a volume, a viscosity, or a temperature of the agricultural product.

Figure 2:
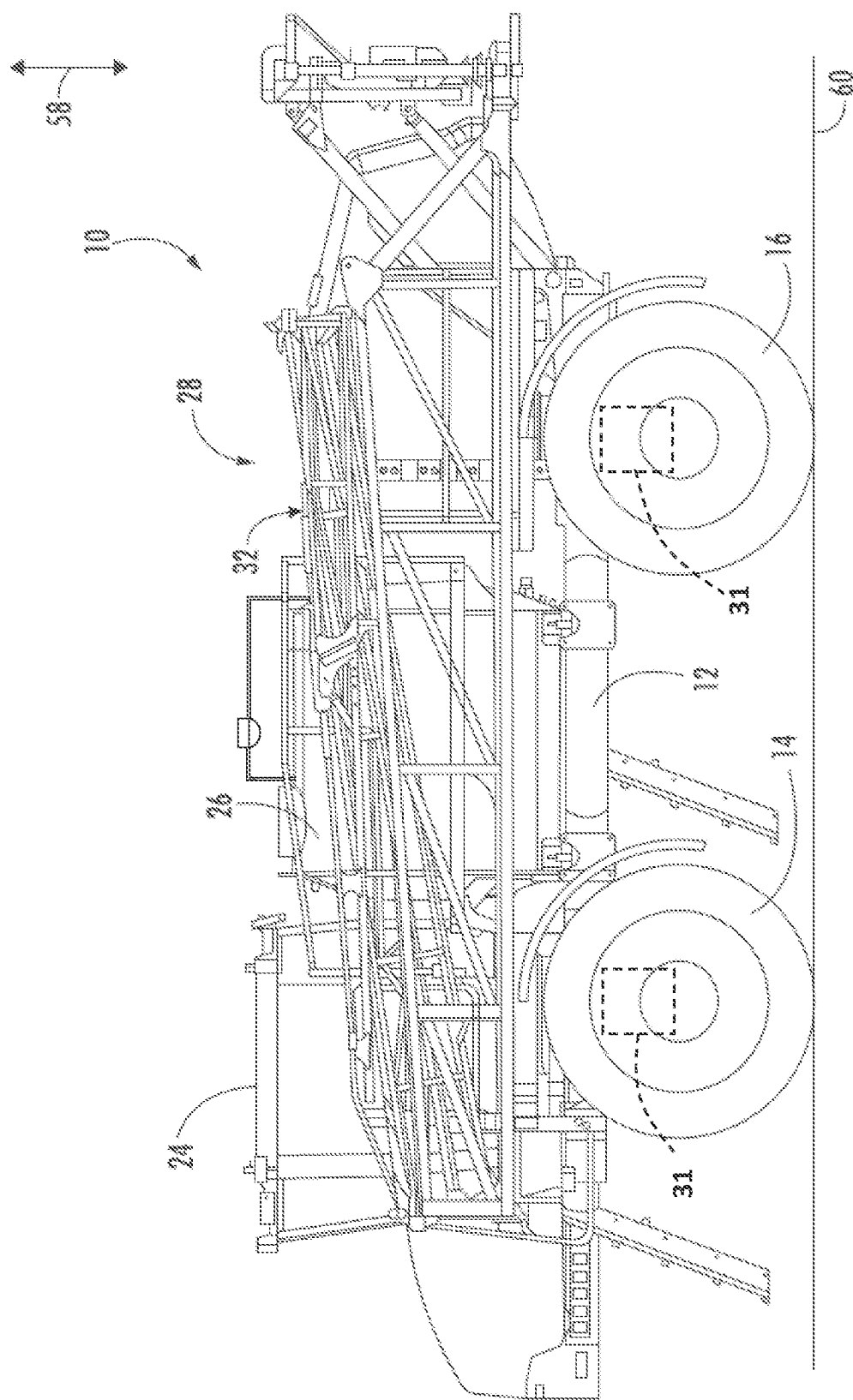
FIG. 2 illustrates a side view of the agricultural sprayer in accordance with aspects of the present subject matter.

Referring now to FIGS. 1 and 2, differing views of an agricultural sprayer 10 are illustrated in accordance with aspects of the present subject matter. Specifically, FIG. 1 illustrates a perspective view of the sprayer 10 with its boom assembly in a working or unfolded position and FIG. 2 illustrates a side view of the sprayer 10 with its boom assembly in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying or application implement.

As shown in FIG. 1, the agricultural sprayer 10 may include a chassis 12 or frame configured to support or couple to a plurality of components. For example, a pair of steerable front wheels 14 (one is shown) and a pair of driven rear wheels 16 (one is shown) may be coupled to the chassis 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine 38 and a transmission 40 configured to transmit power from the engine 38 to the wheels 14, 16. However, it will be appreciated that, in further embodiments, the front wheels 14 of the agricultural sprayer 10 may be driven in addition to or in lieu of the rear wheels 16. The chassis 12 may also support an operator's cab 24 that houses various control or input devices (e.g., levers, pedals, control panels, buttons, and/or the like) for permitting an operator to control the operation of the work sprayer 10. For instance, as shown in FIG. 1, the agricultural sprayer 10 may include a human-machine or user interface 22 for displaying message windows and/or alerts to the operator and/or for allowing the operator to interface with the vehicle's controller or computing system. In some embodiments, the user interface 22 may include joysticks, buttons, knobs and/or any other suitable input devices that allow the operator to provide user inputs to an associated controller or computing system.

Furthermore, the chassis 12 may also support at least one or more product tanks 26 and/or one or more auxiliary tanks 42. Each product tank 26 is generally configured to store or hold an agricultural product, such as a pesticide, an herbicide, a nutrient, and/or the like. The auxiliary tank 42 may be configured to store or hold clean water and/or any other product, which may be different from the agricultural product within the product tank 26.

The chassis 12 may further support a frame or boom assembly 28 mounted on the chassis 12. A plurality of nozzle assemblies 68 are mounted on the boom assembly 28 and configured to selectively dispense the agricultural product stored in the associated product tank 26 and/or the auxiliary tank 42 via the nozzle assemblies 68 onto underlying plants and/or soil. The nozzle assemblies 68 are generally spaced apart from each other on the boom assembly 28 along a lateral direction 50. Furthermore, fluid conduits may fluidly couple the nozzle assemblies 68 to the tank(s) 26, 42. Each nozzle assembly 68 may include a nozzle valve and an associated spray tip or spray nozzle. In several embodiments, the operation of each nozzle valve may be individually controlled by an associated controller or computing system such that the valve regulates the flow rate and/or other spray characteristic of the agricultural product through the associated spray nozzle.

In some embodiments, to improve the agricultural product application quality and/or operator comfort, the sprayer 10 can be equipped with a passive, semi-active, or active suspension system 31 (FIG. 2) to dampen movement of the sprayer 10 during operation. For instance, the suspension system 31 may be configured to isolate the cab 24 and/or the boom assembly 28 from vibrations caused by uneven terrain. Such suspension system can include vibration isolators mounted between the chassis 12 and the wheels 14, 16 of the sprayer 10. Passive systems use passive vibration isolators (e.g., rubber isolators, springs with friction or viscous dampers) to damp vibrations with different isolators used to damp different frequencies. Semi-active systems achieve control and isolation between the chassis 12 and the cab 24 and/or boom assembly 28 by controlling a damper to selectively remove energy from the system in response to movement of the cab/boom (e.g., as monitored via sensors). Active systems use one or more sensors to sense movement and an associated controller or computing system to generate control signals for an actuator which applies a force to the cab 24 and/or boom assembly 28 to cancel vibrations transmitted to the cab/boom by the chassis 12.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a section of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in various embodiments, the boom assembly 28 includes a central boom section 30, a left boom arm 32, and a right boom arm 34. The left boom arm 32 includes a left inner boom section 32A pivotably coupled to the central boom section 30, a left middle boom section 32B pivotably coupled to the left inner boom section 32A, and a left outer boom section 32C pivotably coupled to the left middle boom section 32B. Similarly, the right boom arm 34 includes a right inner boom section 34A pivotably coupled to the central boom section 30, a right middle boom section 34B pivotably coupled to the right inner boom section 34A, and a right outer boom section 34C pivotably coupled to the right middle boom section 34B. Each of the inner boom sections 32A, 34A is pivotably coupled to the central boom section 30 at pivot joints 44. Similarly, the middle boom sections 32B, 34B are pivotally coupled to the respective inner boom sections 32A, 34A at pivot joints 46 while the outer boom sections 32C, 34C are pivotably coupled to the respective middle boom sections 32B, 34B at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along the lateral direction 50 to allow for the performance of an agricultural spraying operation, and a transport position (FIG. 2), in which the boom sections are folded inwardly to reduce the overall width of the boom assembly 28 along the lateral direction 50. It will be appreciated that, although the boom assembly 28 is shown in FIG. 1 as including a central boom section and three individual boom sections coupled to each side of the central boom sections, the boom assembly 28 may generally have any suitable number of boom sections. For example, in other embodiments, each boom arm 32, 34 may include four or more boom sections or less than three boom sections.

Additionally, as shown in FIG. 1, the boom assembly 28 may include inner fold actuators 52 coupled between the inner boom sections 32A, 34A and the central boom section 30 to enable pivoting or folding between the fully-extended working position and the transport position. For example, by retracting/extending the inner fold actuators 52, the inner boom sections 32A, 34A may be pivoted or folded relative to the central boom section 30 about a pivot axis 44A defined by the pivot joints 44. Moreover, the boom assembly 28 may also include middle fold actuators 54 coupled between each inner boom section 32A, 34A and its adjacent middle boom section 32B, 34B and outer fold actuators 56 coupled between each middle boom section 32B, 34B and its adjacent outer boom section 32C, 34C. As such, by retracting/extending the middle and outer fold actuators 54, 56, each middle and outer boom section 32B, 34B, 32C, 34C may be pivoted or folded relative to its respective inwardly adjacent boom section 32A, 34A, 32B, 34B about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32A, 34A, 32B, 34B, 32C, 34C of the boom assembly 28 are configured to be folded horizontally (e.g., parallel to the lateral direction 50) about the pivot axes 44A, 46A, 48A to keep the folding height of the boom assembly 28 as low as possible for transport. However, the pivot axes 44A, 46A, 48A may be oriented along any other suitable direction.

In some embodiments, the boom assembly 28 may include a mast coupled to a frame that, in combination, can support the boom assembly 28 relative to the sprayer chassis 12. For example, the mast may be configured to couple to the chassis 12 via a linkage assembly to transfer a load of the frame to the mast. Furthermore, a boom suspension 124 (FIG. 3) can extend between the frame and the mast and can be configured to dampen movement of the frame relative to the mast, thereby providing a stable platform for the boom assembly 28. In some examples, the boom suspension 124 can include one or more actuators that can be configured to mechanically interconnect the frame to the mast. The one or more actuators may be capable of generally leveling the boom assembly 28 relative to the ground surface. In addition to aiding in leveling the boom assembly 28, the adjustable suspension can also provide various damping levels and/or rigidly couple the frame and the mast to one another.

It will be appreciated that, although not shown in FIGS. 1 and 2, the sprayer 10 may also include various sensors configured to capture data indicative of one or more operating conditions or parameters associated with the performance and/or operation of the sprayer 10. For instance, in some embodiments, sensors may, for example, be installed on the boom assembly 28 to allow operating parameter/conditions associated with the boom to be monitored. However, in other embodiments, one or more sensors may be installed relative to or in association with any other suitable components, features, systems, and/or sub-systems of the sprayer 10.

Figure 3:
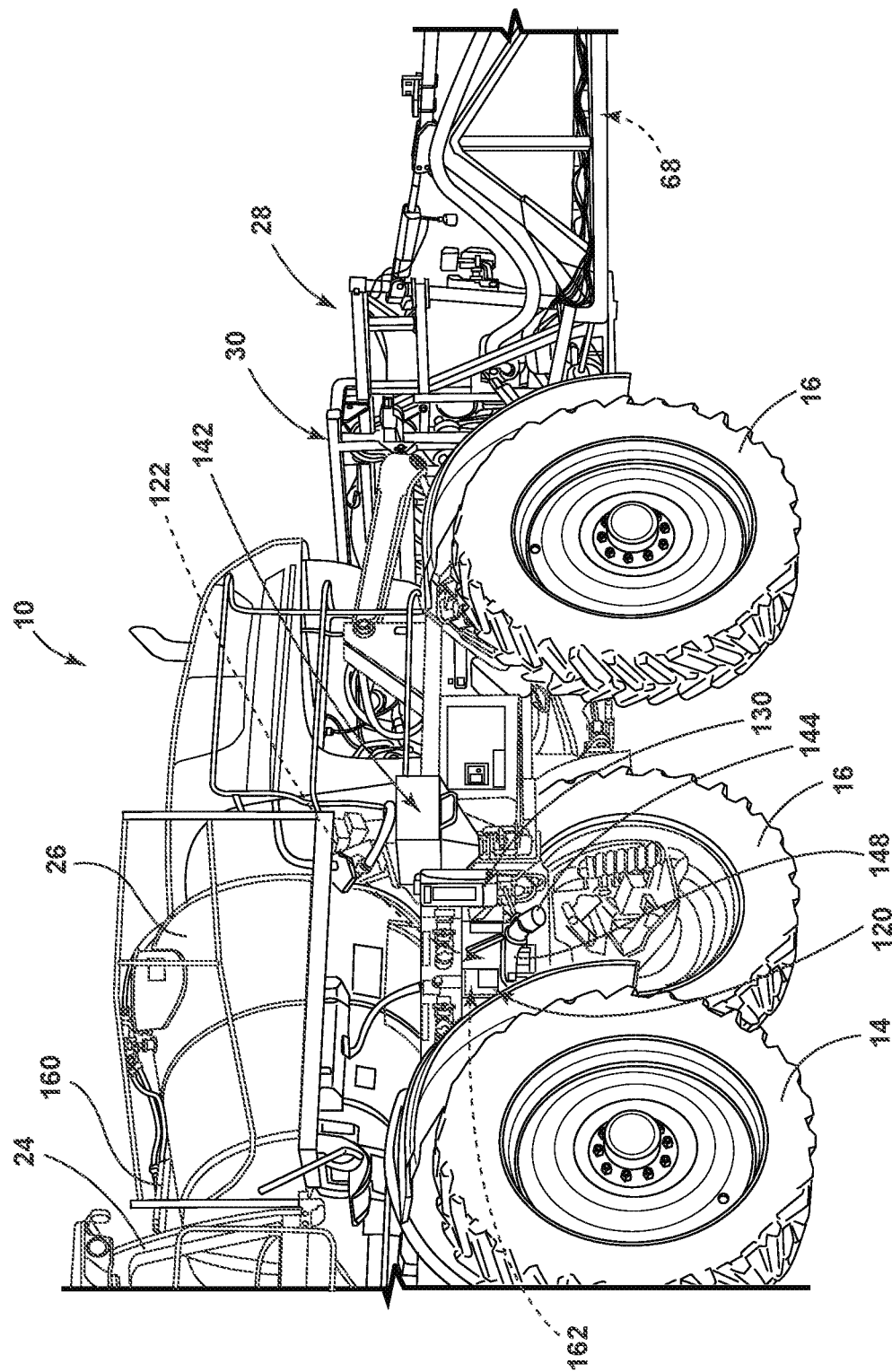
FIG. 3 illustrates a partial side view of the agricultural sprayer in accordance with aspects of the present subject matter.
Figure 4:
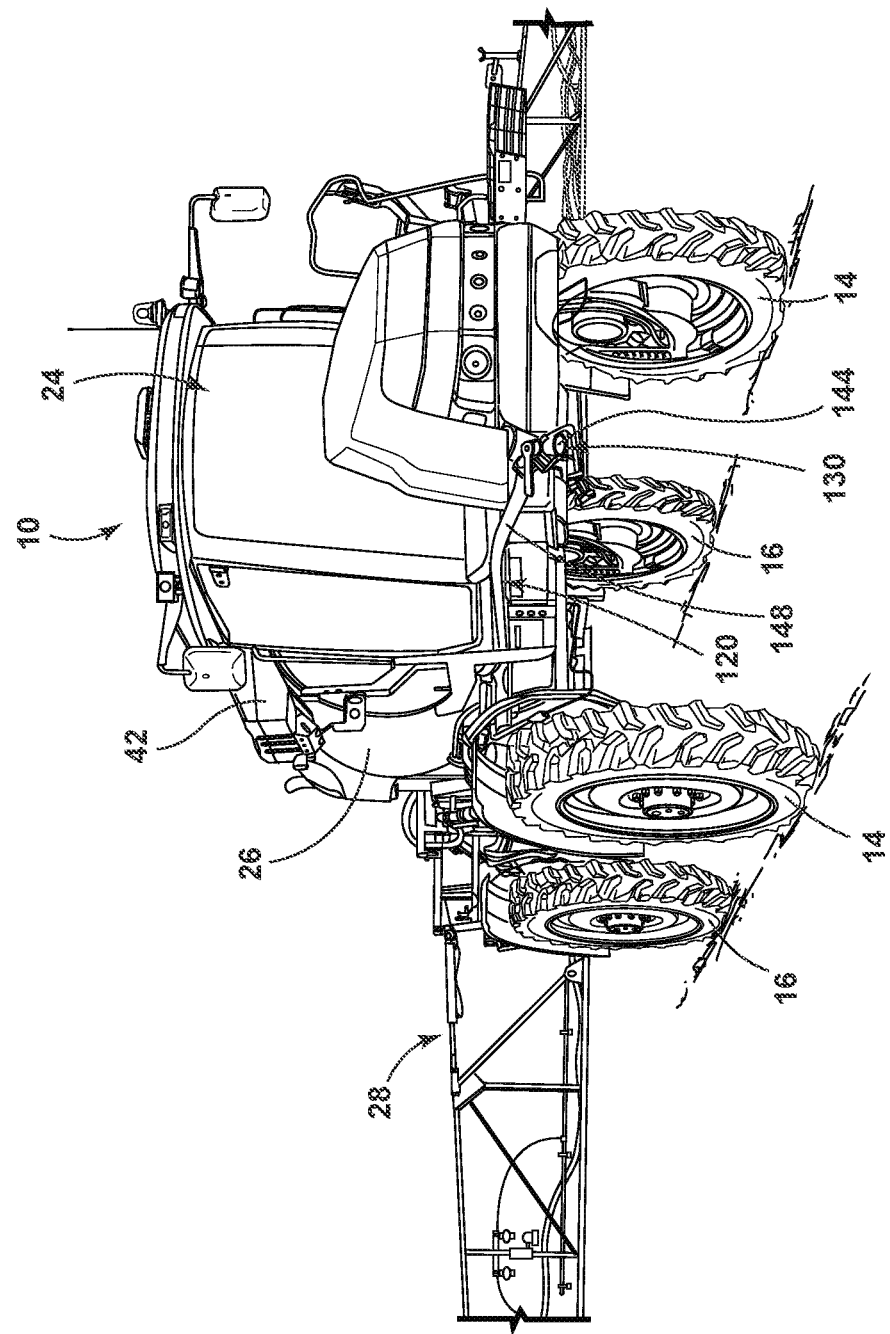
FIG. 4 illustrates a forward perspective view of the agricultural sprayer in accordance with aspects of the present subject matter.

Referring now to FIGS. 3 and 4, differing views of a product system 120 for the agricultural sprayer 10 are illustrated in accordance with aspects of the present subject matter. Specifically, the product system 120 is configured to transfer the agricultural product from an off-board source 138 (FIG. 6) to the product tank 26 and/or the auxiliary tank 42. In some instances, the product system 120 is further configured to store and dispense the agricultural product onto a field on which the sprayer 10 is operated.

In various embodiments, the product system 120 includes, in addition to the product tank 26 and/or the auxiliary tank 42, a fill station 130 to receive the agricultural product that is to be delivered to the product tank 26 and/or the auxiliary tank 42. In several embodiments, the fill station 130 includes an eductor (also referred to as an inductor hopper, hopper, chemical eductor) 142 and a coupling structure 144. The fill station 130 is operably coupled with a flow assembly 122 that includes fluid transport equipment to transfer the agricultural product therethrough to the product tank 26 and/or the auxiliary tank 42.

The eductor 142 may be configured to mix a substance with water (or any other liquid) to form the agricultural product. In various instances, the eductor 142 includes a hopper for containing a quantity of wet or dry substances, a bottom valve block having a fluid inlet and a fluid outlet, and a venturi nozzle within valve block for metering chemicals into a water stream passing between fluid inlet and fluid outlet to mix the chemicals with water to form the agricultural product. The agricultural product may then be directed to the product tank 26.

Additionally or alternatively, the coupling structure 144 of the fill station 130 may provide one or more hose fittings for coupling a fill hose 156 (FIG. 6) to the coupling structure 144 on a first end portion of the fill hose 156. The second end portion of the fill hose 156 may be operably coupled with an off-board product source, such as a fill vehicle and/or a fill tank. As illustrated in FIG. 3, the fill station 130 may include a coupling structure 144 along a side of the sprayer 10. Addition or alternatively, as illustrated in FIG. 4, the fill station 130 may include a coupling structure 144 proximate to a front-end portion of the sprayer 10. As such, the front-end portion of the sprayer 10 may be placed in close proximity to the off-board product source. It will be appreciated that the fill station 130 may have any other assembly for accepting a product through to be stored within the product tank 26 and/or the auxiliary tank 42 without departing from the scope of the present disclosure.

With further reference to FIGS. 3 and 4, during a fill mode, the flow assembly 122 directs the agricultural product from the fill station 130 to the product tank 26. As will be described in greater detail below, a product pump 158 (FIG. 6) may assist in moving the agricultural product from the fill station 130 to the product tank 26 during the fill mode. In some instances, if the capacity of the product tank 26 is exceeded, an overflow duct 160 may exhaust additional agricultural product from the product tank 26.

Upon completion of the fill mode (or any other time), a residual volume of the agricultural product may remain within the flow assembly 122. For example, the residual volume of the agricultural product may be maintained within a conduit 148 of the flow assembly 122. To move the residual volume of the agricultural product to the product tank 26, a reclaim system 164 may be actuated during a reclaim mode of the product system 120. In various examples, the reclaim system 164 may include a movement device 166 that causes the agricultural product to be moved from the flow assembly 122 (e.g., the conduit 148) to the product tank 26. For instance, the movement device 166 may be configured as a pump, a blower, a compressors, a fan, and/or any other practicable device.

In addition to the fill mode and the reclaim mode, the agricultural product system 120 may be configured to operate in an application mode in which the agricultural product is dispensed from the associated product tank 26 and/or the auxiliary tank 42 to the field via the various nozzle assemblies 68 spaced apart along the length of the boom assembly 28.

Further, the product system 120 may be operated in a standby mode when each of the fill mode, the reclaim mode, and the application mode are deactivated. In such instances, the product system 120 may maintain a generally consistent volume of the agricultural product within the product tank 26.

It will be appreciated that the specific configuration of the agricultural sprayers 10 described above and shown in FIGS. 1-4 are provided only to place the present subject matter in an exemplary field of use. In this regard, it should be apparent to those of ordinary skill in the art that the present subject matter may be readily adaptable to any manner of machine configuration that is consistent with the disclosure provided herein.

Figure 5:
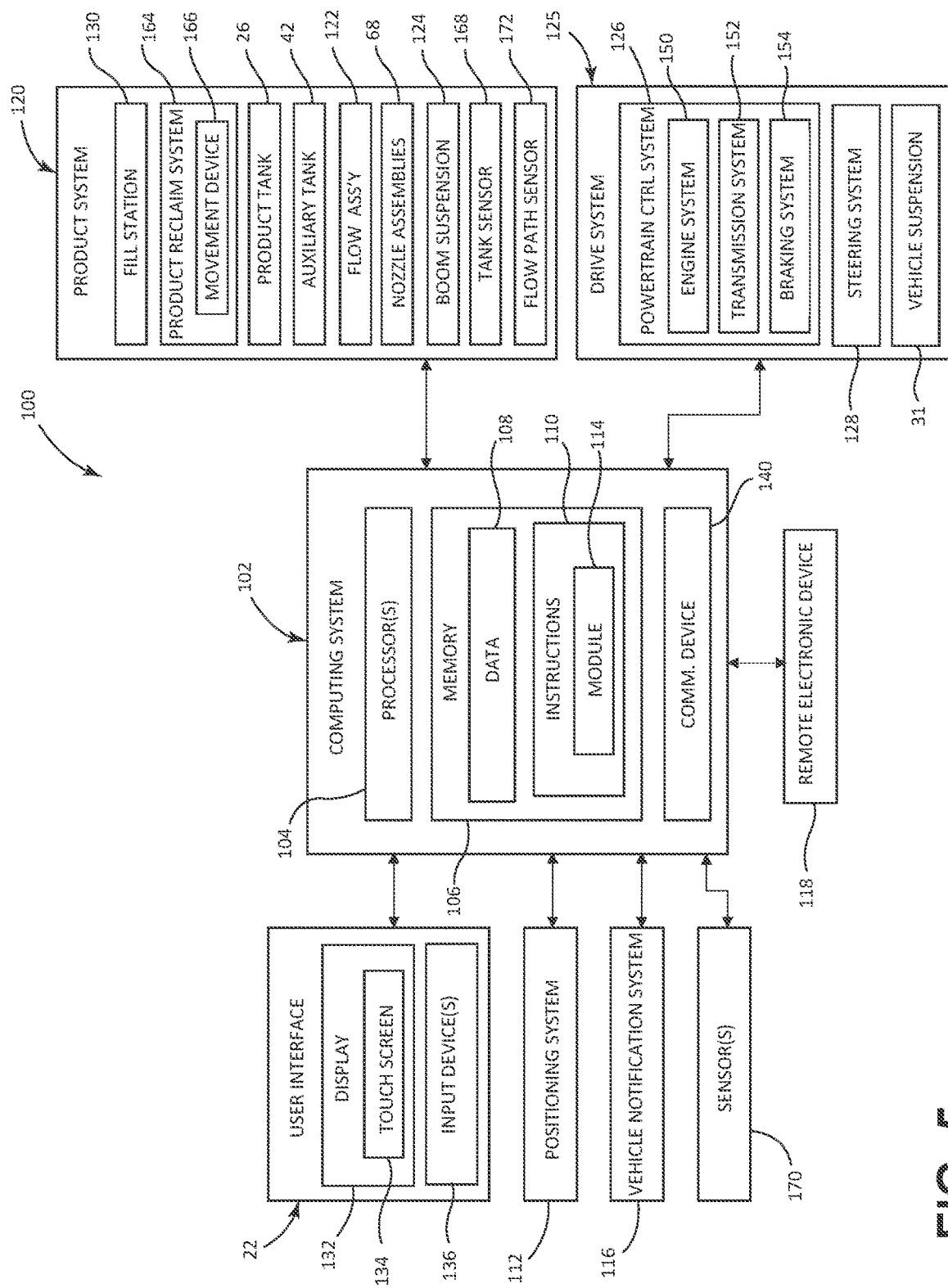
FIG. 5 illustrates a schematic view of a sprayer system in accordance with aspects of the present subject matter.

Referring now to FIG. 5, a schematic view of a sprayer system 100 configured to form part of or otherwise be associated with an agricultural sprayer 10 is illustrated in accordance with aspects of the present subject matter. In general, the system 100 will be described herein with reference to the sprayer 10 described above with reference to FIGS. 1-4. However, it will be appreciated that the disclosed system 100 may generally be utilized with sprayers or other agricultural applicators having any suitable configuration consistent with the disclosure provided herein.

In several embodiments, the system 100 may include a computing system 102 and various components, features, systems and/or sub-systems configured to be communicatively coupled to the computing system 102. In general, the computing system 102 may be configured to perform various computer-related functions or tasks, including, for example, receiving data from one or more components, features, systems and/or sub-systems of the sprayer 10, storing and/or processing data received or generated by the computing system 102, and/or controlling the operation of one or more components, features, systems and/or sub-systems of the sprayer 10.

In general, the computing system 102 may correspond to any suitable processor-based device(s), such as a computing device or any combination of computing devices. Thus, as shown in FIG. 5, the computing system 102 may generally include one or more processor(s) 104 and associated memory devices 106 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 106 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 106 may generally be configured to store information accessible to the processor(s) 104, including data 108 that can be retrieved, manipulated, created and/or stored by the processor(s) 104 and instructions 110 that can be executed by the processor(s) 104.

In several embodiments, the data 108 may be stored in one or more databases. For example, the memory device 106 may include various databases for storing data associated with the operation of the sprayer 10, such as operation data, sensor data, field data, map data, application data, agricultural product data, correlation tables, and/or the like. Such data may include, for example, information received from one or more components, features, systems and/or sub-systems of the sprayer 10. For instance, as shown in FIG. 5, the computing system 102 may be communicatively coupled to a positioning system(s) 112 that is configured determine the location of the sprayer 10 by using a GPS system, a Galileo positioning system, the Global Navigation satellite system (GLONASS), the BeiDou Satellite Navigation and Positioning system, a dead reckoning system, and/or the like. In such embodiments, the location determined by the positioning system(s) 112 may be transmitted to the computing system 102 (e.g., in the form location coordinates) and subsequently stored within a suitable database for subsequent processing and/or analysis. In addition, as shown in FIG. 5, the computing system 102 may be communicatively coupled to the product system 120, which may include one or more tank sensors 168 and/or one or more flow path sensors 172. In such embodiments, the data provided from the sensors may be transmitted to the computing system 102 and subsequently stored within a suitable database for subsequent processing and/or analysis.

Referring still to FIG. 5, in several embodiments, the instructions 110 stored within the memory device 106 of the computing system 102 may be executed by the processor(s) 104 to implement one or more modules 114, such as a data analysis module or an active control module. For example, a data analysis module may be executed or implemented by processor(s) 104 to analyze data received from one or more components, features, systems, and/or sub-systems of the sprayer 10 (e.g., sensors, etc.).

In various instances, the data analysis module may receive information indicative of one or more characteristics of the agricultural product inputted into the fill station 130 during a fill mode. The information may be provided in the form of data from the one or more tank sensors 168, the one or more flow path sensors 172, and/or any other component of the sprayer 10. Additionally or alternatively, the information may be provided in the form of data inputted through the user interface 22 and/or a remote electronic device 118. Upon termination of the fill mode, the data analysis module may determine one or more operating conditions of the reclaim mode based on the one or more characteristics of the agricultural product.

It should be understood that the one or more operating conditions may be determined through an algorithm, look-up table, chart, graph, and/or any other method. For example, the computing system 102 can relate the one or more operating conditions to a volume of the residual volume of the agricultural product remaining within the flow assembly 122. For instance, as the volume of the residual agricultural product is increased, the one or more operating conditions may be adjusted to account for the detected volume of the residual agricultural product. As a non-limiting example, when the residual volume is a first volume, the reclaim process may be initiated for a first time period. When the residual volume is a second volume that is larger than the first volume, the reclaim process may be initiated for a second time period that may be longer than the first time period.

Additionally or alternatively, when the residual volume is a first volume, the reclaim process may be operated at a first pressure. When the residual volume is a second volume that is larger than the first volume, the reclaim process may be operated at a second pressure that may be greater than the first pressure. It will be appreciated that predefined algorithms, look-up tables, charts, graphs, etc. may also be established for each operating condition of the reclaim process based on one or more characteristics of the agricultural product, which may include, but are not limited to, a density, a volume, a viscosity, or a temperature of the agricultural product.

In various instances, each of the operating conditions may be altered relative to one another. For example, if the pressure provided to the flow assembly 122 is increased, the time period of activation of the reclaim system 164 may be reduced, or vice versa. Moreover, if the agricultural product to be moved during a reclaim process can accept a maximum pressure, the remaining operating conditions (time period of activation) may be altered to account for the defined pressure.

Additionally, the active control module may be executed or implemented by the processor(s) 104 to provide notification instructions to the user interface 22, a related vehicle notification system 116 (e.g., including components configured to provide visual, auditory, or haptic feedback, such as lights, speakers vibratory components, and/or the like), and/or a remote electronic device 118.

The active control module may also be capable of altering or adjusting the operation of one or more components, features, systems, and/or sub-systems of the sprayer 10. For instance, in some embodiments, the computing system 102 may utilize the active control module to adjust or control or the operation of one or more components of an agricultural product system 120, such as by controlling the mode of operation of the product system 120 (e.g., one or more pumps, valves, and/or the like) that regulates the supply of the agricultural product to and from the product tank 26 and/or the auxiliary tank 42. For instance, the active control module may adjust or control the operation of one or more components of an agricultural product system 120, such as by controlling the operation of the flow assembly 122 (e.g., one or more pumps, valves, and/or the like) to direct the agricultural product into the product tank 26 and/or the auxiliary tank 42 during a fill mode. Additionally or alternatively, the computing system 102 may utilize the active control module to adjust or control the operation of one or more components of an agricultural product system 120 during an application mode, such as by controlling the operation of the flow assembly 122 to regulate the supply of agricultural product between the product tank 26, and/or the auxiliary tank 42, and the nozzle assemblies 68, by controlling the operation of the nozzle assemblies 68 (e.g., by controlling the nozzle valves using a pulse width modulation (PWM) technique), and/or by controlling any other suitable component of the agricultural product system 120 (e.g., a boom suspension 124). Additionally or alternatively, the computing system 102 may utilize the active control module to adjust or control the operation of one or more components of an agricultural product system 120 during a reclaim mode, such as by controlling one or more operating conditions of the reclaim mode of a reclaim system 164 that includes a movement device 166 configured to move the residual volume of the agricultural product to the product tank 26 and/or the auxiliary tank 42 based on the one or more characteristics of the agricultural product.

In addition, various other components may be adjusted or controlled by the computing system 102 via execution or implementation of the active control module. For instance, the computing system 102 may be configured to adjust or control or the operation of one or more components, sub-systems, or systems of a sprayer drive system 125, such as by controlling the operation of a powertrain control system 126, a steering system 128, the sprayer suspension system 31, and/or the like.

In some examples, the user interface 22 may be mounted within a cockpit module, an instrument cluster, and/or any other location within the cab 24. Additionally or alternatively, the user interface 22 may be integrated within and/or proximate to the fill station 130 and mounted on an exterior portion of the sprayer 10.

In various examples, the user interface 22 of the disclosed system 100 may include a display 132 having a touchscreen 134. The display 132 may be capable of displaying information related to the operation of the sprayer 10. In some embodiments, the display 132 may include an input device in the form of circuitry within the touchscreen to receive an input corresponding with a location over the display 132. Additionally, the user interface 22 may also include various other types or forms of input devices 136, such as one or more joysticks, buttons, knobs, levers, input pads, and/or the like.

In several embodiments, the computing system 102 may be configured to communicate via wired and/or wireless communication with one or more remote electronic devices 118 through a communications device 140 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 118 may include a display for displaying information to a user. For instance, the electronic device 118 may display one or more graphical user interfaces and may be capable of receiving remote user inputs associated with adjusting operating variables or thresholds associated with the sprayer 10. In addition, the electronic device 118 may provide feedback information, such as visual, audible, and tactile alerts and/or allow the operator to alter or adjust one or more components, features, systems, and/or sub-systems of the sprayer 10 through usage of the remote electronic device 118. It will be appreciated that the electronic device 118 may be any one of a variety of computing devices and may include a processor and memory. For example, the electronic device 118 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols.

In several embodiments, in addition to, or in lieu of acquiring information in the form of data from the one or more tank sensors 168, the one or more flow path sensors 172, and/or any other component of the sprayer system, the information may be provided in the form of data inputted through the user interface 22 and/or a remote electronic device 118. In such embodiments, the computing system may detect termination of the fill mode and activate a reclaim mode to move the agricultural product from the flow assembly 122 to the product tank 26 through activation of the reclaim system 164 with one or more operating conditions of the reclaim mode being based on the one or more characteristics of the agricultural product.

With further reference to FIG. 5, in some embodiments, the powertrain control system 126 includes an engine output control system 150, a transmission control system 152, and a braking control system 154. The engine output control system 150 is configured to vary the output of the engine 38 (FIG. 1) to control the speed of the sprayer 10. For example, the engine output control system 150 may vary a throttle setting of the engine 38, a fuel/air mixture of the engine 38, a timing of the engine 38, and/or other suitable engine parameters to control engine output. In addition, the transmission control system 152 may adjust gear selection within a transmission 40 (FIG. 1) to control the speed of the sprayer 10. Furthermore, the braking control system 154 may adjust braking force, thereby controlling the speed of the sprayer 10. While the illustrated powertrain control system 126 includes the engine output control system 150, the transmission control system 152, and the braking control system 154, it will be appreciated that alternative embodiments may include one or two of these systems, in any suitable combination. Further embodiments may include a powertrain control system 126 having other and/or additional systems to facilitate adjusting the speed of the sprayer 10.

Referring still to FIG. 5, the agricultural product system 120 may include a variety of components that may be operated in various modes. For example, the computing system 102 may operate the product system 120 in a fill mode in which an agricultural product is received through a fill station 130 and transferred to the product tank 26 and/or the auxiliary tank 42 through the flow assembly 122. In some embodiments, the flow assembly 122 can include a pump, restrictive orifices, valves, and/or the like to regulate the flow of the agricultural product from the fill station 130 to the product tank 26 and/or the auxiliary tank 42.

The computing system 102 may also operate the product system 120 in a reclaim mode to move the agricultural product from the flow assembly 122 to the product tank 26 through activation of the reclaim system 164. For example, the flow assembly 122 may include a conduit 148 and a product circuit 162. The conduit 148 may be coupled with the fill station 130 and the product circuit 162 and/or the tank(s) 26, 42. When filled, a residual volume of the agricultural product is retained within the conduit 148 and/or the product circuit 162. The reclaim system 164 may include a movement device 166 that is configured to move the residual volume of the agricultural product to the product tank 26 while the product system 120 operates in the reclaim mode.

Additionally, the computing system 102 may be configured to operate the product system 120 in an application mode in which the product system 120 is configured to dispense a product from the product tank 26 and/or the auxiliary tank 42 to the field via the various nozzle assemblies 68 spaced apart along the length of the boom assembly 28. In some embodiments, the flow assembly 122 of the application system 120 can regulate the flow of agricultural product from the associated product tank 26 and/or the auxiliary tank 42 to the nozzle assemblies 68. In some cases, the flow assembly 122 may regulate flow based on an analysis of one or more application variables. For instance, in cases where the sprayer 10 has received an instruction to adjusts its ground speed, the computing system 102 may adjust a flow rate of the agricultural product from the associated product tank 26 and/or the auxiliary tank 42 to the nozzle assemblies 68 through control of the flow assembly 122 to ensure proper application of the product to the underlying field. Additionally (or alternatively), the computing system 102 may individually control the operation of each nozzle assembly 68 to ensure proper application of the product to the underlying field.

Further, the product system 120 may be operated in a standby mode when each of the fill mode, the reclaim mode, and the application mode are deactivated. In such instances, the product system 120 may maintain a generally consistent volume of the agricultural product within the product tank 26.

In various embodiments, the computing system 102 may be toggled between the various modes manually and/or automatically. For example, the computing system 102 may receive an input, from the user interface 22 and/or a remote electronic device 118, to actuate the reclaim system 164. In response, the movement device 166 operably coupled with the flow assembly 122 may be activated to move the agricultural product from the flow assembly 122 to the product tank 26 and/or the auxiliary tank 42.

In some embodiments, a user may provide an input through the user interface 22 or the remote electronic device 118 for the product system 120 to be placed in the fill mode. Based on the received input, the computing system 102 may place the sprayer 10 in the fill mode. Additionally or alternatively, in order for the product system 120 to enter the fill mode, one or more system 100 conditions may be verified. For example, the computing system 102 may verify that the fill valve 200 within the coupling structure 144 is in an open position and the reclaim valve is in a closed position. In addition, the computing system 102 may verify that the flow assembly 122 is activated to assist with moving the agricultural product from the fill station 130 to the product tank 26 and/or the auxiliary tank 42.

In some embodiments, a user may provide an input through the user interface 22 or the remote electronic device 118 for the product system 120 to be placed in the reclaim mode. Based on the received input, the computing system 102 may place the sprayer 10 in the reclaim mode. Additionally or alternatively, the computing system 102 may place the product system 120 in the fill mode automatically (e.g., without a user input between the termination of the fill mode and the initiation of the fill mode) based on various conditions being accomplished. For example, after the fill mode is complete and there is a change within the powertrain control system 126, such as transitioning a parking brake from an engaged state to a disengaged state, the computing system 102 may activate the reclaim mode. In such instances, the product system 120 may perform a reclaim operation as the sprayer 10 moves from the product source to a starting position of the spray operation.

Further, a user may provide an input through the user interface 22 or the remote electronic device 118 for the product system 120 to be placed in the application mode. Based on the received input, the computing system 102 may place the sprayer 10 in the application mode. Additionally or alternatively, the application mode may be activated once various conditions are met.

With further reference to FIG. 5, in several embodiments, the product system 120 may also include one or more tank sensors 168 and/or one or more flow path sensors 172. The one or more flow path sensors 172 may include a fill flow path sensor 172 communicatively coupled with the conduit 148 and configured to provide data indicative of one or more characteristics of the agricultural product within the flow assembly 122 and/or a product flow rate of the agricultural product during a fill operation to the computing system 102. For example, the one or more characteristics of the agricultural product can include, but are not limited to, at least one of a density, a volume, a viscosity, or a temperature of the agricultural product. The one or more flow path sensors 172 may additionally or alternatively include an application flow path sensor 172 that is configured to provide data indicative of one or more characteristics of the agricultural product within the flow assembly 122 and/or data indicative of a product flow rate during a spray operation to the computing system 102. Suitable flow path sensors 172 may include flow meters, pressure sensors, motion sensors (e.g., accelerometers, gyroscopes, etc.), vision sensors (e.g., cameras, LIDAR devices, etc.), radar sensors, ultrasonic sensors, and/or the like. In various embodiments, a single flow path sensor 172 may be positioned within the product system 120 that is configured to monitor a product flow rate of the agricultural product during both the fill operation and the spray operation.

In some instances, the computing system 102 may ignore the inputs from the fill flow path sensor 172 during the spray and reclaim operations in order to maintain a more accurate reading of the volume of material within the product tank 26 and/or flow assembly 122. Specifically, as the fill flow path sensor 172 has provided the computing system 102 with data indicative of the volume of product provided to the product tank 26 and/or the auxiliary tank 42 during a fill operation, any flow after the completion of the fill mode would recount a volume of product that was already identified as onboard the sprayer 10.

The one or more tank sensors 168 may be capable of providing the computing system 102 with data indicative of detect the one or more characteristics of the agricultural product within the product tank 26 and/or a volume of the agricultural product within the product tank 26 and/or data indicative of a volume of product within the auxiliary tank 42. For example, the one or more characteristics of the agricultural product can include, but are not limited to, at least one of a density, a volume, a viscosity, or a temperature of the agricultural product. In various embodiments, the one or more tank sensors 168 may be embodied as position sensors, flow sensors, pressure sensors, motion sensors (e.g., accelerometers, gyroscopes, etc.), vision sensors (e.g., cameras, LIDAR devices, etc.), radar sensors, ultrasonic sensors, and/or the like.

In some embodiments, the boom suspension 124 may be configured to dampen movement of the frame relative to the mast, thereby providing a more stable platform for the boom assembly 28. The boom suspension 124 may allow for various damping levels based on an operator input and/or such damping levels may be automatically altered or selected by the computing system 102 (e.g., based on data received from one or more sensors). In some embodiments, the boom suspension 124 may be automatically adjusted based on data received from another system or sub-systems of the sprayer 10 as well. For instance, the damping level of the boom assembly 28 may be adjusted based on the computing system 102 receiving instructions to alter the powertrain system 126 and/or the steering system 128 of the sprayer 10. Additionally, or alternatively, the damping level may be adjusted in response to data received from any other component, system, and/or sub-systems of the sprayer 10.

Additionally, as shown in FIG. 5, the system 100 may also include various sensors 170 for monitoring one or more operating conditions or parameters associated with the sprayer 10, including monitoring operating conditions/parameters associated with any suitable components, systems, and/or sub-systems of the sprayer 10. Suitable sensors may include position sensors, flow sensors, pressure sensors, motion sensors (e.g., accelerometers, gyroscopes, etc.), vision sensors (e.g., cameras, LIDAR devices, etc.), radar sensors, ultrasonic sensors, and/or the like, depending on the specific operating condition(s)/parameter(s) being monitored.

Referring to FIGS. 6-13, schematic diagrams of the product system 120 are illustrated in accordance with aspects of the present subject matter. In general, the product system 120 may be implemented within the sprayer system that allows for an agricultural product to be moved from an off-board source 138 to a product tank 26 and/or an auxiliary tank 42 of a sprayer 10.

In various examples, the fill station 130 is configured to receive the agricultural product that is to be delivered to the product tank 26 and/or the auxiliary tank 42. Each product tank 26 is generally configured to store or hold an agricultural product for delivery to the nozzle assemblies 68. The auxiliary tank 42 may be configured to store or hold clean water and/or any other product, which may be different from the agricultural product within the product tank 26. In various instances, the nozzle assemblies 68 mounted on a boom assembly 28 and configured to selectively dispense the agricultural product stored in the associated product tank 26 and/or the auxiliary tank 42 via the nozzle assemblies 68 onto underlying plants and/or soil.

As illustrated in FIGS. 6-13, the fill station 130, the product tank 26, the auxiliary tank 42, and the nozzle assemblies 68 may be fluidly coupled with one another through the flow assembly 122. The flow assembly 122 can include a conduit 148 that is fluidly coupled with the fill station 130 and a product circuit 162. The flow assembly 122 may further include one or more pumps 158 and/or plumbing-type components that may collectively define various flow paths that are selectively defined through the flow assembly 122 to achieve corresponding functions of product system 120. Plumbing-type components include those of lines systems which may include interconnected lines such as tubes, pipes, hoses, and those of valve systems with actuatable valves, including electronically controllable valves such as electronically actuated ball valves. Some of the components may be shared between various flow paths as the product system 120 is operated in the various modes described herein.

Figure 6:
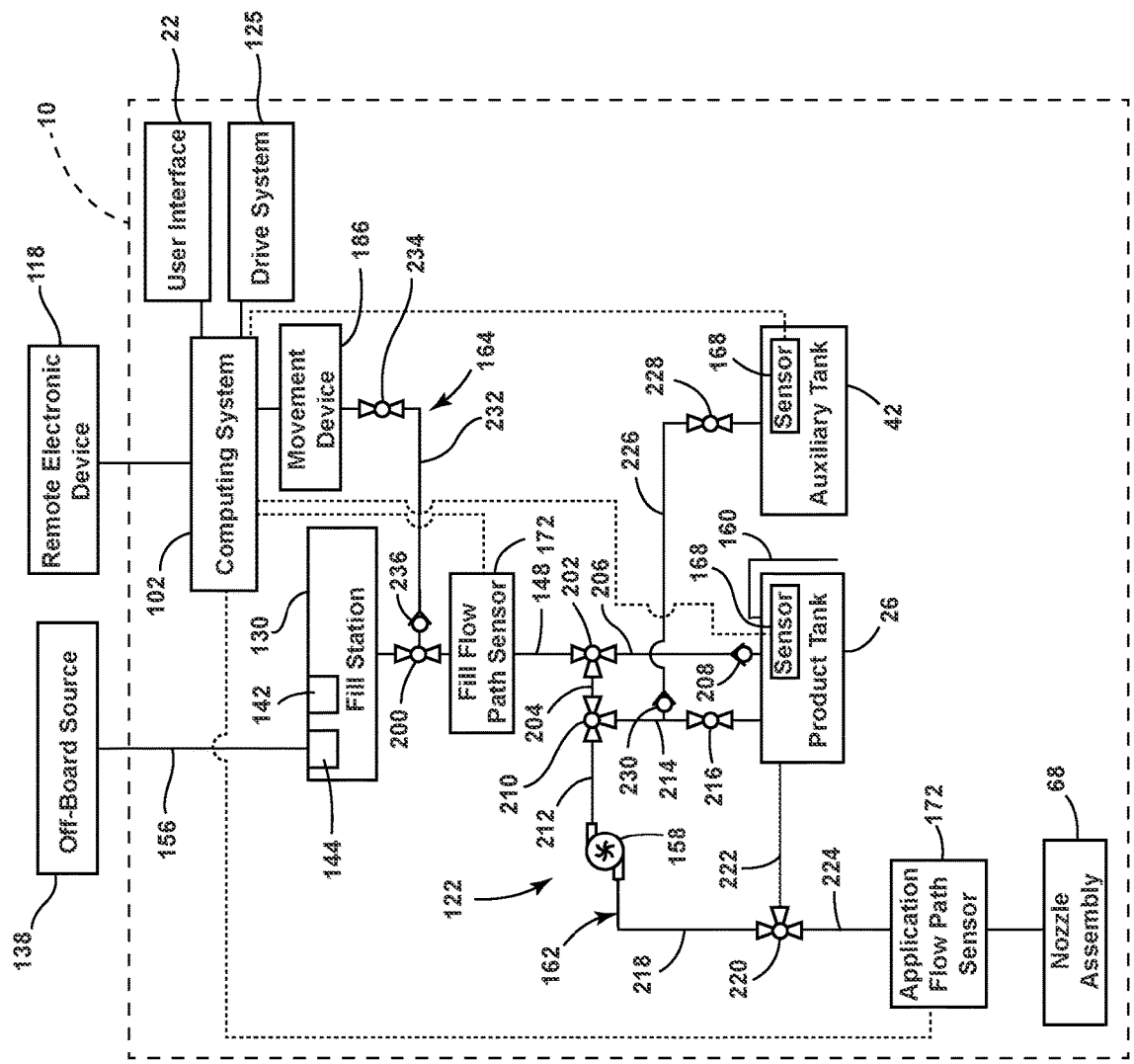
FIG. 6 is a simplified schematic representation of a product system in accordance with aspects of the present subject matter.

Referring now to FIG. 6, a product pump 158 is fluidly coupled with both the conduit 148 and the product circuit 162. The product pump 158 may be configured to deliver the agricultural product and/or auxiliary tank solution from the fill station 130 to the respective tank 26, 42 and/or from the tank 26, 42 to the nozzle assemblies 68 (and/or other locations within the overall fluid-delivery system).

In the illustrated embodiment, a fill valve 200 is mounted proximate to an inlet portion of the conduit 148 can be actuated to selectively allow or prevent flow from the fill station 130 to the conduit 148. A fill selector valve 202 may be positioned downstream of the fill valve 200 and may be implemented as a three-way valve. The fill selector valve 202 may be configured to receive the agricultural product through the conduit 148. A first outlet of the fill selector valve 202 may selectively allow or prevent flow of the agricultural product to a fill delivery line 204. A second outlet of the fill selector valve 202 may selectively allow or prevent flow of the agricultural product to a product tank bypass line 206. A fill flow path sensor 172 may be positioned downstream of the fill valve 200 and upstream of the fill selector valve 202.

The product bypass line 206 is downstream of the fill selector valve 202 and may direct agricultural product from at least the conduit 148 to the product tank 26. In some instances, a bypass line check valve shown as check valve 208 has one-way operation and automatically opens to allow flow in a downstream direction from the fill selector valve 202 and closes to prevent upstream flow from the product tank 26.

In the embodiment illustrated in FIG. 6, a feed valve 210 may be positioned downstream of the fill delivery line 204 and is configured to selectively allow or prevent flow from the fill delivery line 204 to a pump inlet line 212. The feed valve 210 may also selectively allow or prevent flow from a first end portion of a product outlet line 214 to the pump inlet line 212. An opposing end portion of the pump inlet line 212 may be fluidly coupled with the product tank 26. A product valve 216 is mounted within the product outlet line 214 can be actuated to selectively allow or prevent flow from the product tank 26 to the feed valve 210.

The feed valve 210 may output flow from the fill delivery line 204 and/or the product outlet line 214 to the pump inlet line 212, which directs the agricultural product to the product pump 158. The product pump 158 may be any device that moves the agricultural product through the flow assembly 122. A pump outlet line 218 delivers the agricultural product in a downstream direction from the product pump 158 to a product circuit valve 220. The product circuit valve 220 may selectively allow or prevent the agricultural product to flow from the pump outlet line 218 to a product tank inlet line 222 and/or an application line 224. The product tank inlet line 222 may fluidly couple the product circuit valve 220 to the product tank 26. The application line 224 may fluidly couple the product circuit valve 220 to the nozzle assemblies 68. As provided herein, the nozzle assemblies 68 may be mounted on a boom assembly 28 and configured to selectively dispense the agricultural product stored in the associated product tank 26 and/or the auxiliary tank 42 via the nozzle assemblies 68 onto underlying plants and/or soil.

An application flow path sensor 172 may be positioned between the product circuit valve 220 and the nozzle assemblies 68. The application flow path sensor 172 may be configured to provide data indicative of a product flow rate during a spray operation to the computing system 102.

With further reference to FIG. 6, an auxiliary tank outlet line 226 fluidly couples the auxiliary tank 42 to the product outlet line 214. An auxiliary tank outlet valve 228 may be mounted in the auxiliary tank outlet line 226 and can be actuated to selectively allow or prevent flow of an auxiliary tank solution from the auxiliary tank 42 to the product outlet line 214. In some instances, an auxiliary tank check valve shown as check valve 230 has one-way operation and automatically opens to allow flow in a downstream direction from the auxiliary tank 42 and closes to prevent upstream flow to the auxiliary tank 42.

The product system 120 further includes the reclaim system 164 that includes a movement device 166 fluidly coupled with a reclaim line 232. The reclaim line 232 may further be coupled with the conduit 148 at a position downstream of the fill valve 200. A reclaim valve 234 is positioned within the reclaim line 232 and can be actuated to selectively allow or prevent flow from the movement device 166. As provided herein, the movement device 166 may be implemented as a pump, a blower, a compressors, a fan, and/or any other practicable device, which may be configured to provide pressurized fluid or gas (e.g., air) to the conduit 148. The pressurized fluid or gas may be configured to move the residual agricultural product within the conduit 148 and/or the product circuit 162 of the flow assembly 122 to the product tank 26. The pressurized fluid or gas may be exhausted through an overflow duct 160 fluidly coupled with the product tank 26. In some instances, a reclaim line 232 check valve shown as check valve 236 has one-way operation and automatically opens to allow flow in a downstream direction from the reclaim valve 234 and closes to prevent upstream flow from the conduit 148.

As provided herein, the product tank 26 and/or the auxiliary tank 42 may include a tank sensor 168 for providing data indicative of a volume of agricultural product within each respective tank 26, 42 to the computing system 102. In various embodiments, the computing system 102 may activate or deactivate various components of the flow assembly 122 based on data received from one or more of the tank sensors 168.

The computing system 102 may be configured to control the components of the flow assembly 122 to selectively define the product flow path(s) during operation. For example, the agricultural product is moved along a first path in the fill mode, a second path in the reclaim mode, and a third path in the application mode.

A user interface 22 may also be operably coupled with the computing system 102 and allows an operator to control operation of various components of the product system 120. For example, the user interface 22 may be used to place the sprayer 10 in various modes. In addition, the computing system 102 may receive data from various other systems (e.g., the drive system) and selectively define the flow path when various conditions are verified. Additionally or alternatively, the reclaim process may be initiated automatically (e.g., by the computing system 102 without operator input between the completion of the fill mode and the initiation of the reclaim mode) based on one or more predefined conditions.

Figure 7:
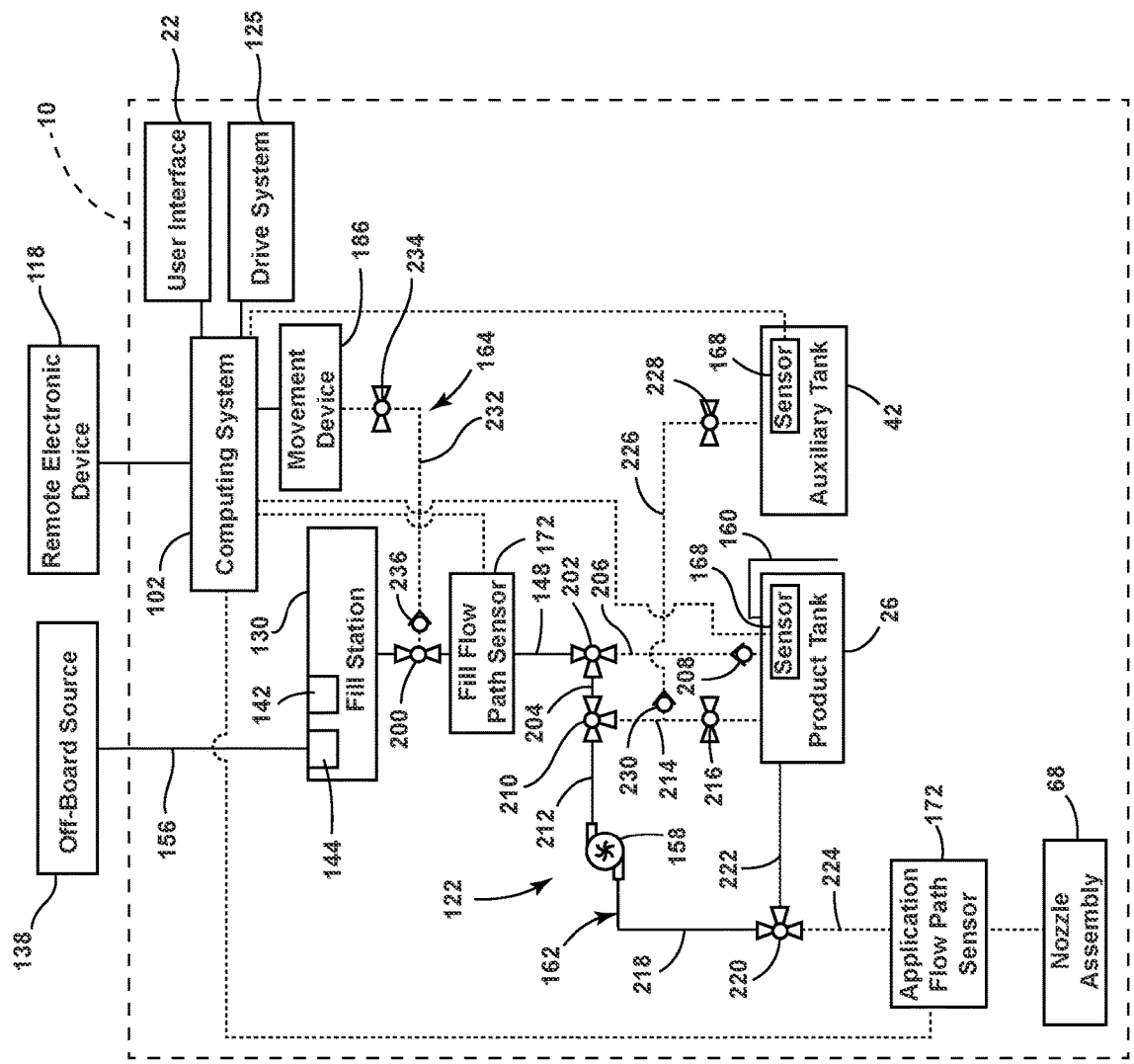
FIG. 7 is a simplified schematic representation of the product system of FIG. 6 operating in a fill mode in accordance with aspects of the present subject matter.
Figure 8:
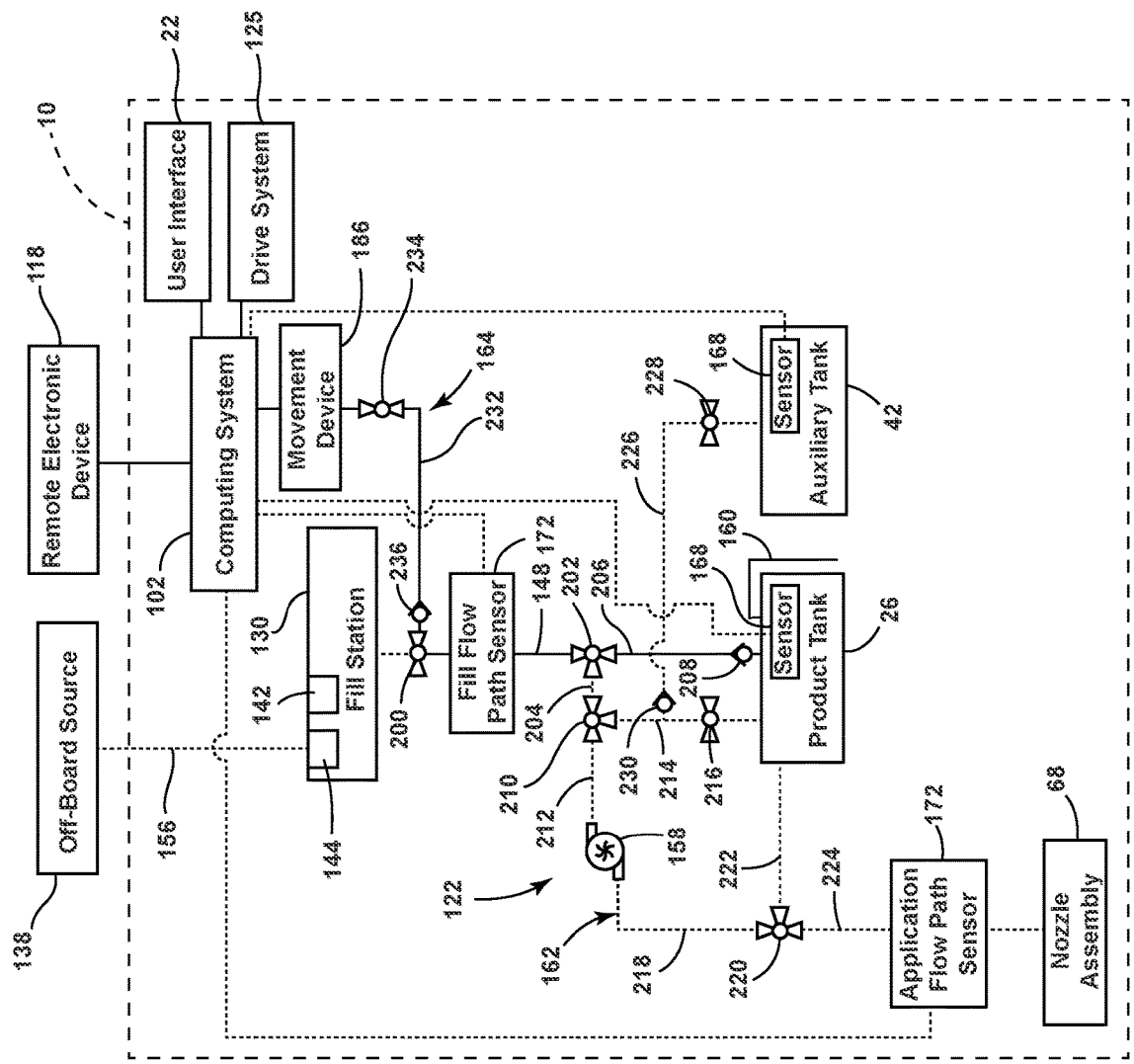
FIG. 8 is a simplified schematic representation of the product system of FIG. 6 operating in a reclaim mode in accordance with aspects of the present subject matter.
Figure 9:
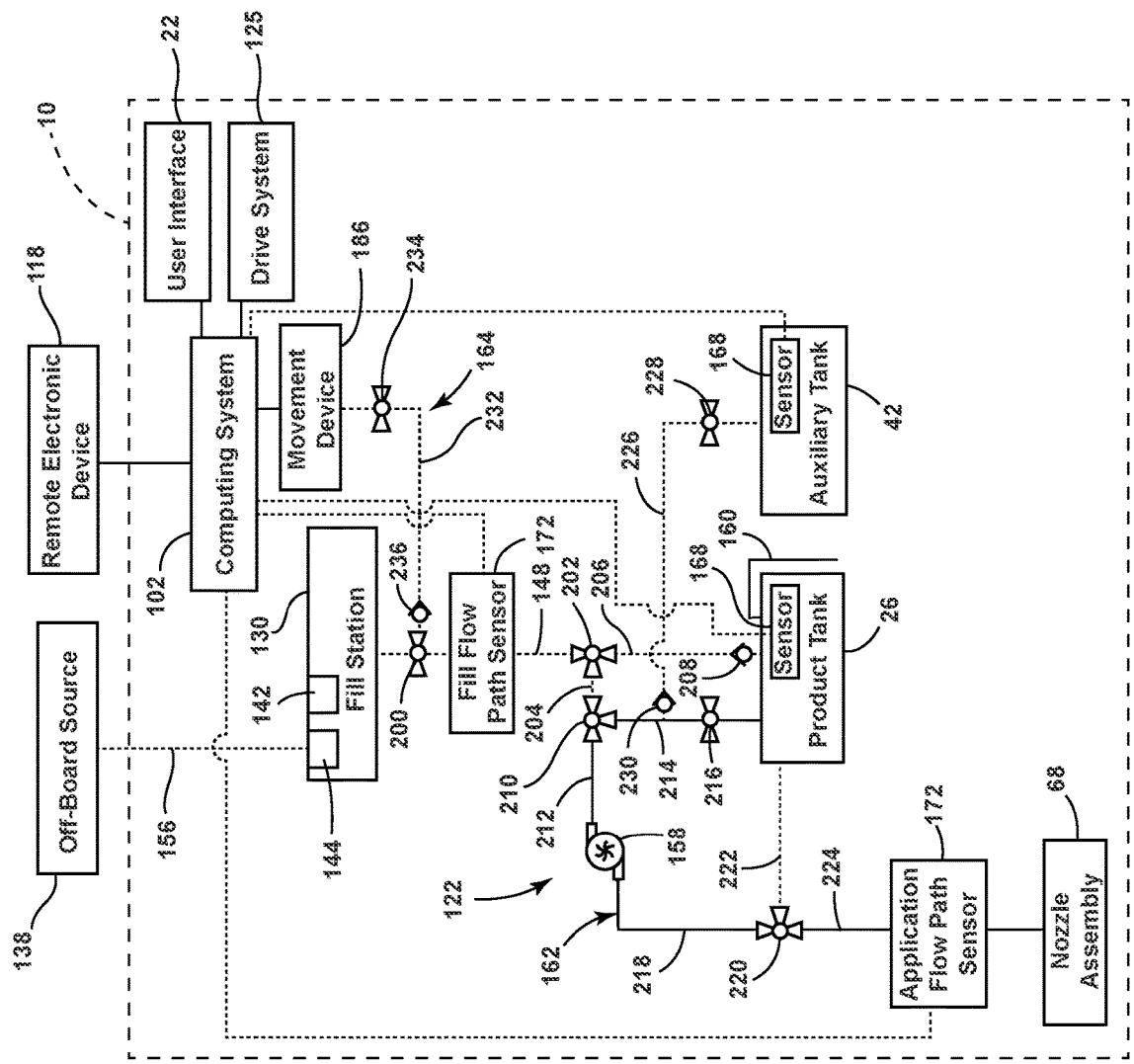
FIG. 9 is a simplified schematic representation of the product system of FIG. 6 operating in a first application mode in accordance with aspects of the present subject matter.
Figure 10:
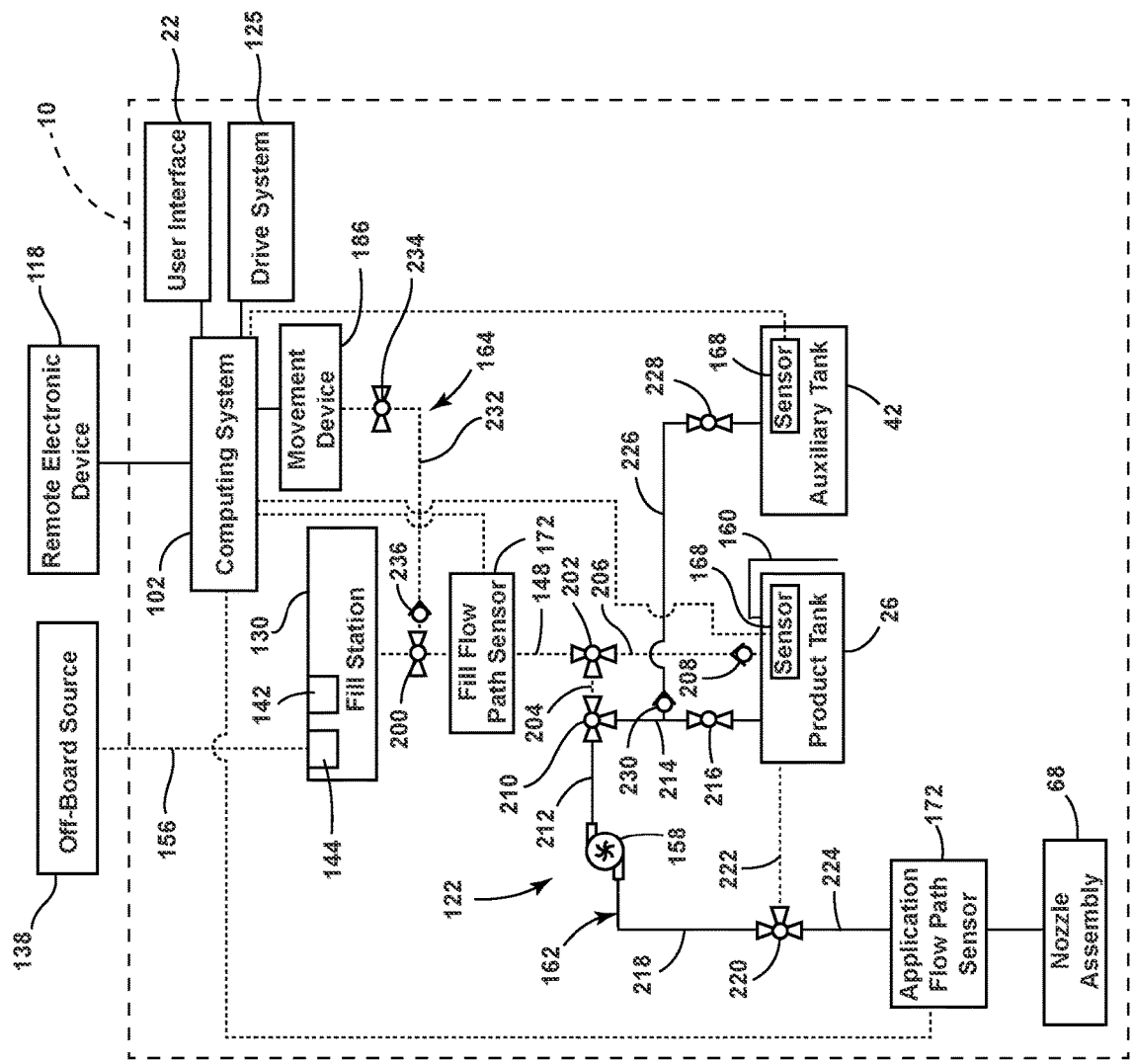
FIG. 10 is a simplified schematic representation of the product system of FIG. 6 operating in a second application mode in accordance with aspects of the present subject matter.
Figure 11:
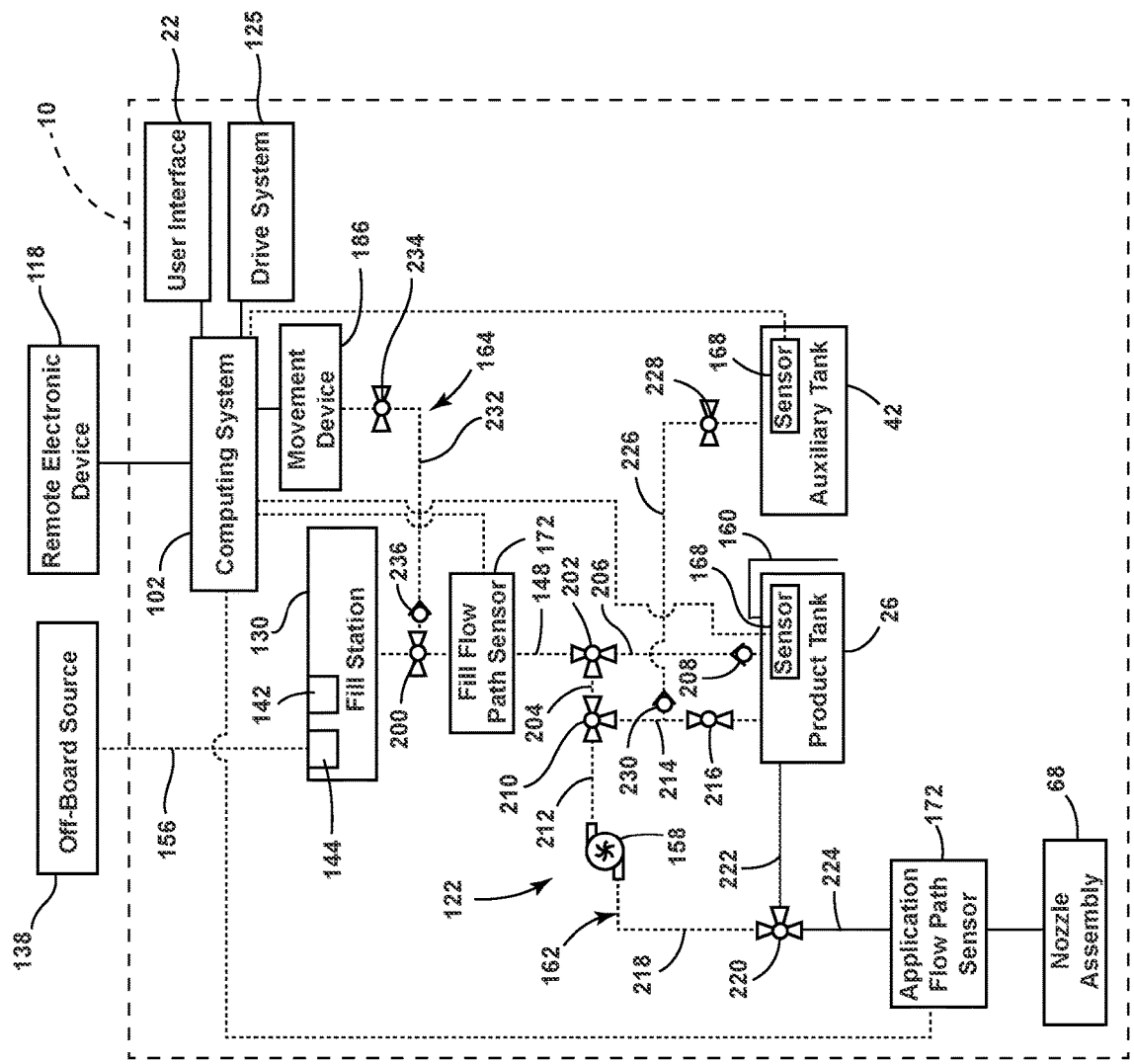
FIG. 11 is a simplified schematic representation of the product system of FIG. 6 operating in a third application mode in accordance with aspects of the present subject matter.

Referring now to FIGS. 7-11, various flow paths of the product system 120 based on a mode of operation are illustrated in accordance with aspects of the present subject matter. Specifically, FIG. 7 illustrates the product system 120 of some embodiments in the fill mode, FIG. 8 illustrates the product system 120 of some embodiments in the reclaim mode, and FIGS. 9-11 illustrate the product system 120 of some embodiments in various application modes.

Referring further to FIG. 7, a flow path of the flow assembly 122 with the product system 120 in a fill mode is illustrated in accordance with aspects of the present disclosure. In various embodiments, the agricultural product may be provided from an off-board source 138 to the product system 120. In various embodiments, the product pump 158 may be activated to move the agricultural product from the fill station 130 to the product tank 26. As the agricultural product is moved from the off-board source 138 to the product tank 26 during the fill mode, the fill flow path sensor 172 may provide data to the computing system 102 indicative of an amount of agricultural product transferred from the off-board source 138 to the sprayer 10. Once a volume of product reaches a predefined transfer volume, the product pump 158 may be deactivated by the computing system 102 and the off-board source 138 may be decoupled from the fill station 130.

In some embodiments, once the fill station 130 is placed in a fill mode, the computing system 102 may verify that the sprayer 10 is in a parked state and may place the fill valve 200 in the open position to allow the agricultural product to flow from the fill station 130 through the product pump 158 and onto the product tank 26.

Referring now to FIG. 8, a flow path of the flow assembly 122 with the product system 120 in a reclaim mode is illustrated in accordance with aspects of the present disclosure. The reclaim mode may be initiated by the computing system 102 when the fill mode is completed or terminated, which initiates a reclaim process. The reclaim process may be configured to move additional, residual agricultural product within the flow assembly 122 to the product tank 26. In various embodiments, the product pump 158 may be deactivated and/or not fluidly coupled with the conduit 148 during the reclaim process. Rather, a movement device 166 may be activated to provide a pressurized fluid or gas to the flow assembly 122. The pressurized fluid or gas is configured to move the residual agricultural product from the flow assembly 122 to the product tank 26. In various embodiments, the pressurized fluid or gas may be exhausted from the product tank 26 through the overflow duct 160 of the product tank 26. As the product and the pressurized fluid or gas is moved to the product tank 26, the computing system 102 may disregard the data provided from the fill flow path sensor 172 as the product was already detected as entering the product system 120 during the fill mode.

In various embodiments, the reclaim process may be initiated manually through an input received through the user interface 22 and/or the remote electronic device 118. Additionally or alternatively, the reclaim process may be initiated automatically (e.g., by the computing system 102 without operator input between the completion of the fill mode and the initiation of the reclaim mode) based on one or more predefined conditions. For example, the conditions may include that the fill mode is completed, and the drive system is no longer in a parked state.

If the predefined conditions are met, the computing system 102 may verify that the fill valve 200 is in a closed position and place the reclaim valve 234 in the open position. With the reclaim valve 234 in the open position, the movement device 166 may provide pressurized fluid or gas to move the product from the conduit 148 and/or the product bypass line 206 to the product tank 26. In various instances, the reclaim mode may be initiated during movement of the sprayer 10 to an application location within an agricultural field after the product is inputted into the product system 120. By completing the reclaim process during movement, non-spraying time may be reduced.

In several embodiments, a sensor (e.g. 168, 172) within the product system 120 may be configured to detect a characteristic of the agricultural product. Additionally or alternatively, the characteristic of the agricultural product may be provided through a user interface 22, a remote electronic device 118, and/or through any other device. The computing system 102 may be communicatively coupled to the sensor (e.g. 168, 172), the user interface 22, and/or the remote electronic device 118.

The computing system may determine various operating conditions for the reclaim system 164 for each reclaim mode. The operating conditions may include a pressure provided to the flow assembly during a reclaim mode, a predefined time period for activation, and/or any other operating condition of the reclaim system 164. As such, the computing system may be configured to command the reclaim system 164 to provide a predefined pressure to the flow assembly during a reclaim mode based on the characteristic of the agricultural product. Additionally or alternatively, the computing system 102 may be configured to activate the reclaim system 164 for a predefined time period during a reclaim mode based on the characteristic of the agricultural product. In various embodiments, the characteristic of the agricultural product includes at least one of a density, a volume, a viscosity, or a temperature of the agricultural product. Each of the one or more operating conditions may be determined through an algorithm, look-up table, chart, graph, and/or any other method based on the characteristic of the agricultural product. In such instances, the computing system 102 may be configured to compare the characteristic to an algorithm, look-up table, chart, and/or graph and determine the predefined pressure based on the algorithm, look-up table, chart, and/or graph.

Further, in various embodiments, a first reclaim process may be completed with the system 120 in the reclaim mode. The product system 120 may determine an amount of the agricultural product moved from the flow assembly to the product tank during the first reclaim process. Based on the characteristics of the agricultural product and the detected results from the first reclaim process, a subsequent, second reclaim process may be initiated if the volume exceeds a residual threshold. As such, the first reclaim process may be conducted with a first set of operating conditions and the second reclaim process may be completed with a second set of operating conditions with at least one of the operating conditions within the first set varying from second set.

Referring now to FIGS. 9-11, various application modes are schematically illustrated in accordance with various aspects of the present disclosure. Specifically, FIG. 9 illustrates a flow path in which the agricultural product is provided from the product tank 26 to the product pump 158 and to the nozzle assemblies 68. FIG. 10 illustrates a flow path in which the agricultural product of the product tank 26 is combined with the agricultural product of the auxiliary tank 42 upstream of the product pump 158. FIG. 11 illustrates a flow path in which the agricultural product is provided to the application line 224 downstream of the product pump 158. In various embodiments, the computing system 102 may determine a flow path of the application mode based on various inputs and factors.

Figure 12:
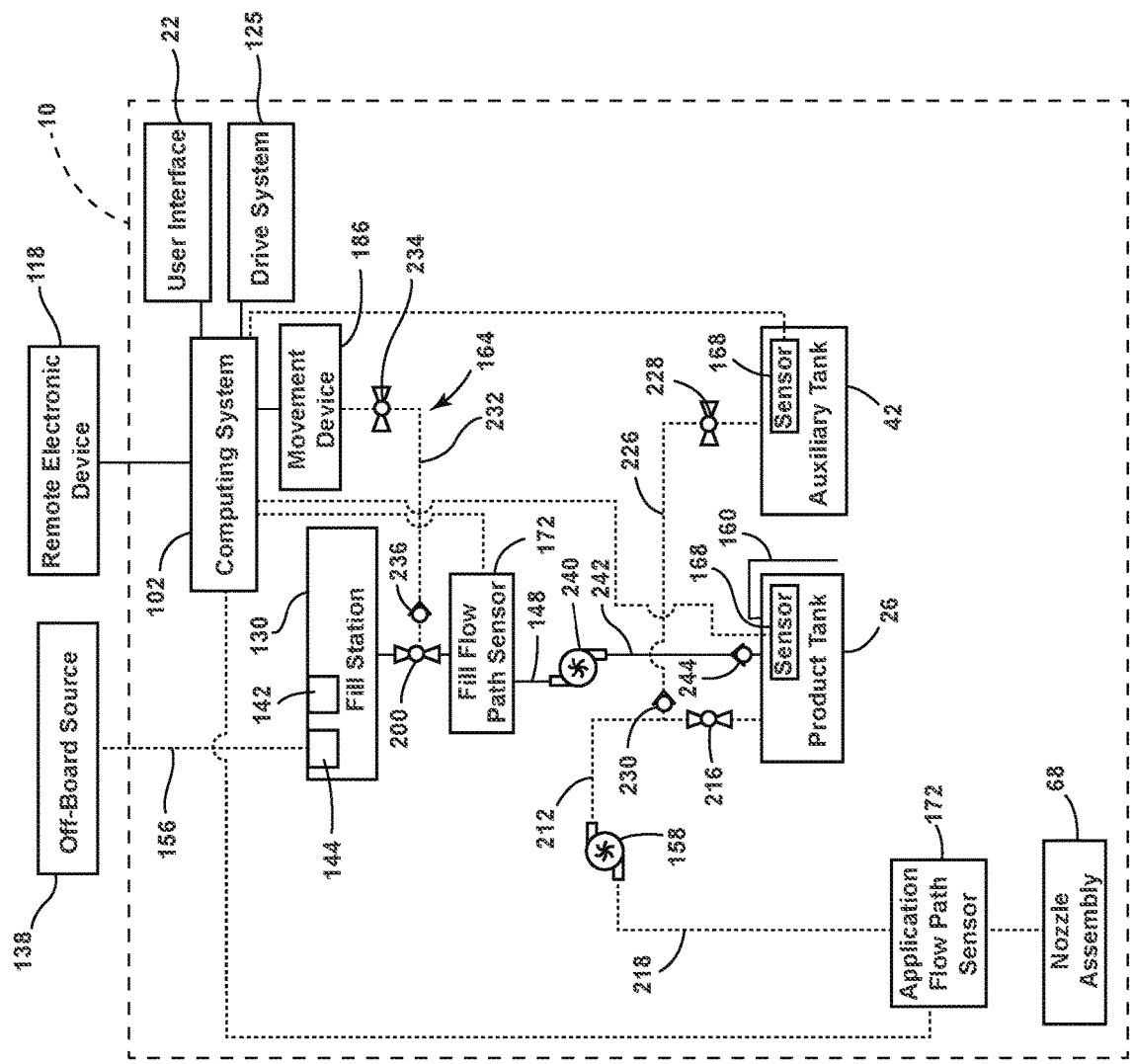
FIG. 12 is a simplified schematic representation of the product system operating in a fill mode in accordance with aspects of the present subject matter.
Figure 13:
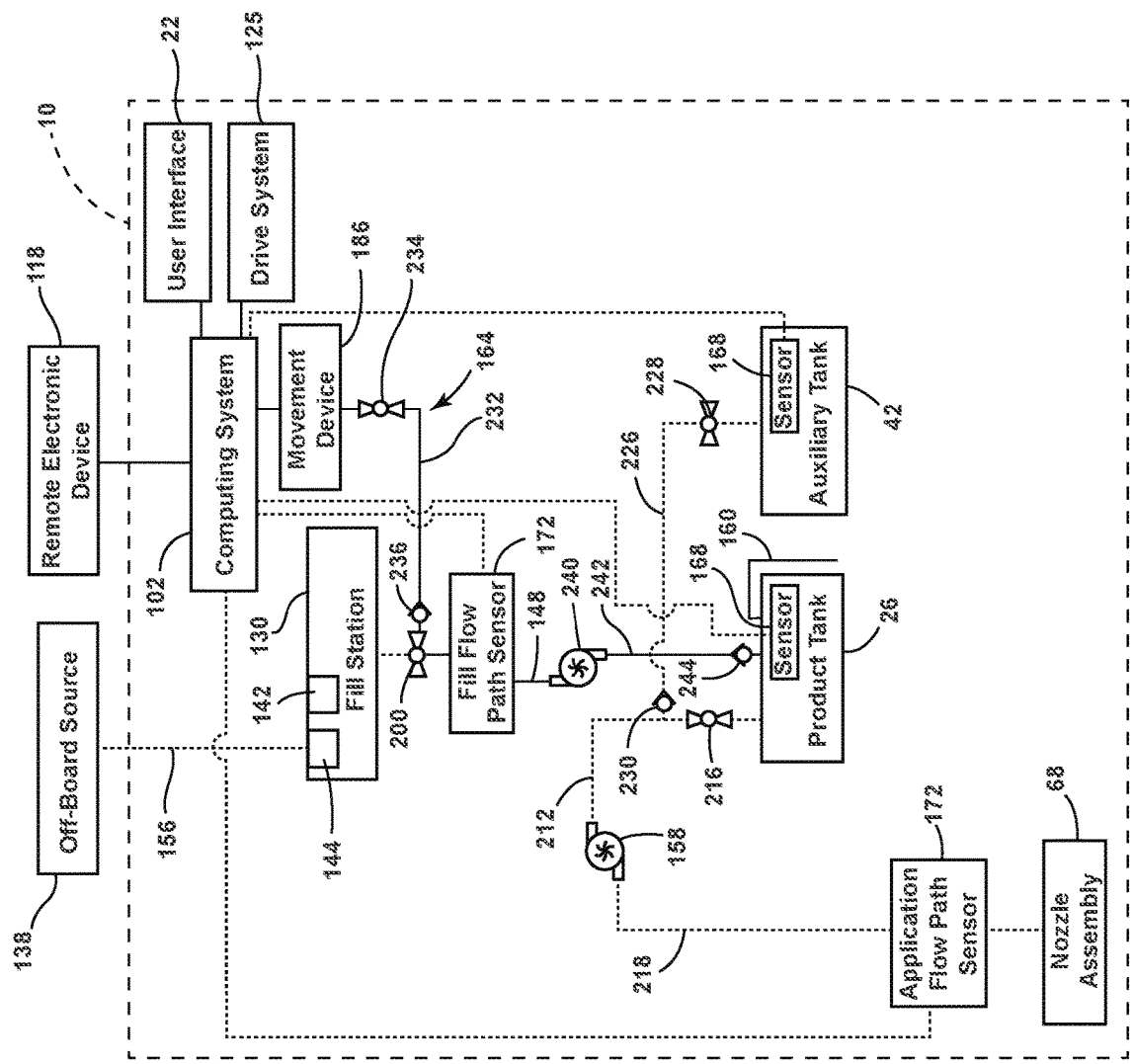
FIG. 13 is a simplified schematic representation of the product system operating in a reclaim mode in accordance with aspects of the present subject matter.

Referring now to FIGS. 12 and 13, in some embodiments, the conduit 148 may be coupled with both the fill station 130 and the product tank 26. Moreover, the flow assembly 122 may have a dedicated pump 240 that is configured to deliver the agricultural product from the fill station 130 to the product tank 26 while the product pump 158 moves the agricultural product from the product tank 26 to the nozzle assemblies 68.

With further reference to FIG. 12, a flow path of the flow assembly 122 with the product system 120 in a fill mode is illustrated in accordance with aspects of the present disclosure. In various embodiments, the agricultural product may be provided from an off-board source 138 to the product system 120. In various embodiments, the fill pump 240 may be activated to move the agricultural product from the fill station 130 through the conduit 148 to the fill pump 240. From the fill pump 240, the agricultural product may be directed through a fill line 242 to the product tank 26. In the illustrated embodiment, a conduit check valve shown as check valve 244 has one-way operation and automatically opens to allow flow in a downstream direction from the pump 240 and closes to prevent upstream flow from the product tank 26.

As the agricultural product is moved from the off-board source 138 to the product tank 26 during the fill mode, the fill flow path sensor 172 may provide data to the computing system 102 indicative of an amount of agricultural product transferred from the off-board source 138 to the sprayer 10. Once a volume of product reaches a predefined transfer volume, the product pump 158 may be deactivated by the computing system 102 and the off-board source 138 may be decoupled from the fill station 130.

With reference to FIG. 13, a flow path of the flow assembly 122 with the product system 120 in a reclaim mode is illustrated in accordance with aspects of the present disclosure. The reclaim mode may be initiated by the computing system 102 when the fill mode is completed or terminated, which initiates a reclaim process. The reclaim process may be configured to move additional, residual agricultural product within the flow assembly 122 to the product tank 26. In various embodiments, the fill pump 240 may be deactivated during the reclaim process. Rather, a movement device 166 may be activated to provide a pressurized fluid or gas to the flow assembly 122. The pressurized fluid or gas is configured to move the residual agricultural product from the flow assembly 122 to the product tank 26. The pressuring fluid or gas and the agricultural product may pass through the conduit check valve shown as check valve 244 that automatically opens to allow flow in a downstream direction from the reclaim line 232 and closes to prevent upstream flow from the product tank 26.

In various embodiments, the pressurized fluid or gas may be exhausted from the product tank 26 through the overflow duct 160 of the product tank 26. As the product and the pressurized fluid or gas is moved to the product tank 26, the computing system 102 may disregard the data provided from the fill flow path sensor 172 as the product was already detected as entering the product system 120 during the fill mode.

As provided herein, the reclaim process may be initiated manually through an input received through the user interface 22 and/or the remote electronic device 118. Additionally or alternatively, the reclaim process may be initiated automatically (e.g., by the computing system 102 without operator input between the completion of the fill mode and the initiation of the reclaim mode) based on one or more predefined conditions. For example, the conditions may include that the fill mode is completed, and the drive system is no longer in a parked state.

If the predefined conditions are met, the computing system 102 may verify that the fill valve 200 is in a closed position and place the reclaim valve 234 in the open position. With the reclaim valve 234 in the open position, the movement device 166 may provide pressurized fluid or gas to move the product from the conduit 148 to the product tank 26.

Figure 14:
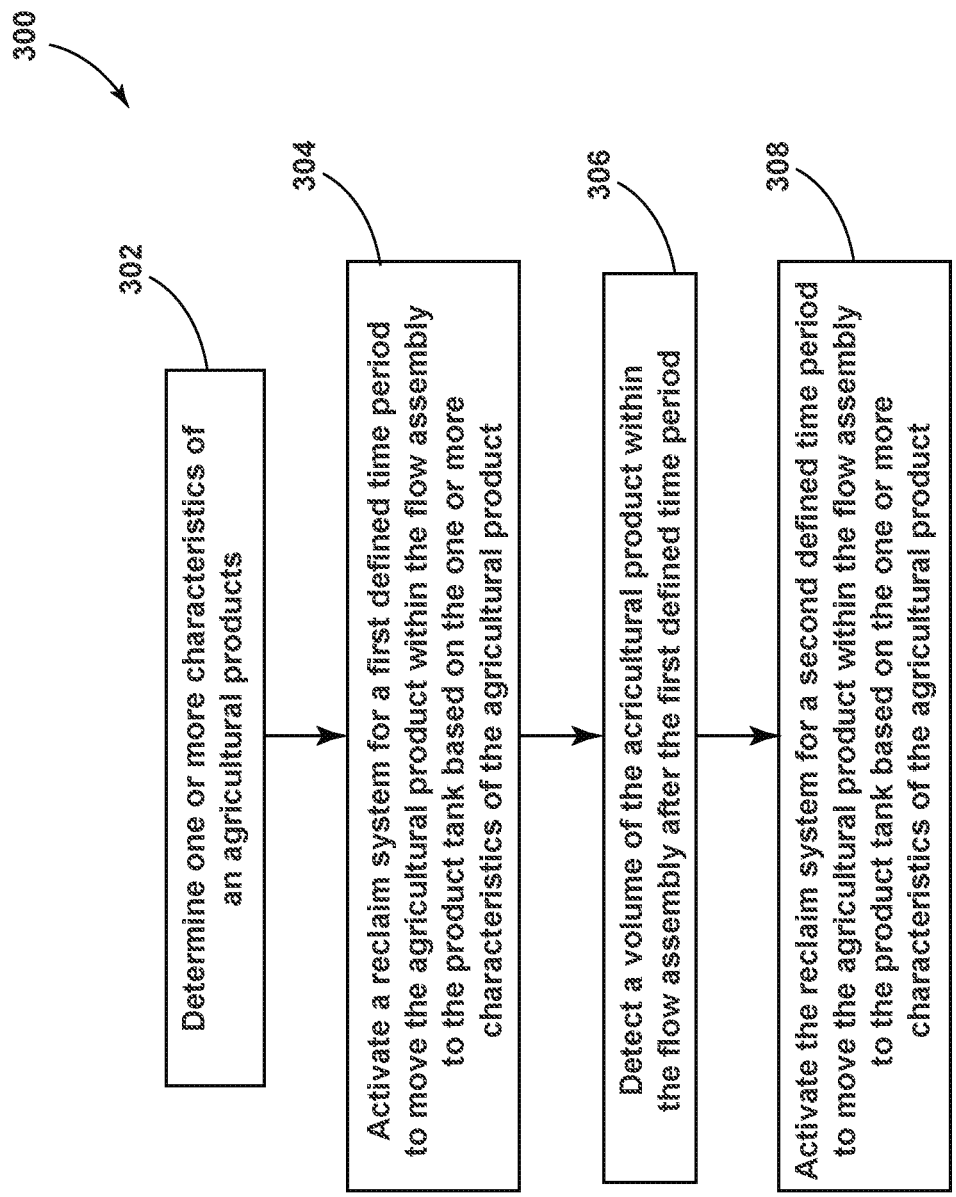
FIG. 14 illustrates a flow diagram of a method for operation of a product system in accordance with aspects of the present subject matter.

Referring now to FIG. 14, a flow diagram of some embodiments of a method 300 for operation of a product system is illustrated in accordance with aspects of the present subject matter. In general, the method 300 will be described herein with reference to the sprayer 10, the sprayer system 100, and the product system described above with reference to FIGS. 1-13. However, it will be appreciated by those of ordinary skill in the art that the disclosed method 300 may generally be utilized with any suitable agricultural sprayer 10 and/or may be utilized in connection with a system having any other suitable system configuration. In addition, although FIG. 14 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 14, at (302), the method 300 includes determining one or more characteristics of an agricultural product. In various instances, determining one or more characteristics of an agricultural product may include receiving information indicative of one or more characteristics of the agricultural product inputted into the fill station during a fill mode. The information may be provided in the form of data from the one or more tank sensors 168, the one or more flow path sensors 172, and/or any other component of the sprayer system. Additionally or alternatively, the information may be provided in the form of data inputted through the user interface and/or a remote electronic device.

At (304), the method 300 includes activating a reclaim system for a first defined time period to move the agricultural product within the flow assembly to the product tank based on the one or more characteristics of the agricultural product. In some instances, activating for the reclaim system for the first defined time period may include generating the first defined time period based on one or more look-up tables associated with the one or more characteristics of the agricultural product.

At (306), the method includes detecting a volume of the agricultural product within the flow assembly after the first defined time period. At (308), the method may include activating the reclaim system for a second defined time period to move the agricultural product within the flow assembly to the product tank based on the one or more characteristics of the agricultural product. In some instances, activating the reclaim system for a second defined time period may occur when a residual volume of agricultural product within the flow assembly exceeds a predefined threshold.

As indicated above, it will be appreciated that the present subject matter is also directed to methods for reclaiming agricultural product within a fill station of an agricultural sprayer. Such methods may generally be implemented or executed in any manner consistent with the disclosure provided herein.

It is to be understood that the steps of any method disclosed herein may be performed by a computing system upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer readable medium. The computing system loads the software code or instructions via a direct interface with the computer readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A product system for an agricultural sprayer, the system comprising:
    a product tank configured to store an agricultural product;
    an application line fluidly coupled with the product tank and configured to deliver the agricultural product from the product tank to a nozzle assembly;
    a fill station configured to accept the agricultural product from an off-board source;
    a flow assembly fluidly coupled with the fill station and configured to direct the agricultural product into the product tank;
    a reclaim system configured to provide the agricultural product within the flow assembly to the product tank; and
    a computing system communicatively coupled to the reclaim system, the computing system being configured to:
        receive information indicative of one or more characteristics of the agricultural product inputted into the fill station during a fill mode;
        detect, through the computing system, termination of the fill mode; and
        activate, through the computing system, a reclaim mode to move the agricultural product from the flow assembly to the product tank through activation of the reclaim system, wherein one or more operating conditions of the reclaim mode are based on the one or more characteristics of the agricultural product.

2. The system of claim 1, further comprising:
    a flow path sensor configured to detect the one or more characteristics of the agricultural product within the flow assembly.

3. The system of claim 1, further comprising:
    a tank sensor configured to detect the one or more characteristics of the agricultural product within the product tank.

4. The system of claim 1, further comprising:
    a user interface communicatively coupled with the computing system, wherein the computing system receives the one or more characteristics of the agricultural product through the user interface.

5. The system of claim 1, wherein the one or more characteristics of the agricultural product includes at least one of a density, a volume, a viscosity, or a temperature of the agricultural product.

6. The system of claim 1, wherein the one or more conditions includes a predefined pressure at which the reclaim system exhausts a fluid or gas into the flow assembly.

7. The system of claim 1, wherein the one or more operating conditions includes a predefined time period for which the reclaim system exhausts a fluid or gas into the flow assembly.

8. The system of claim 1, wherein the reclaim system is configured to provide pressurized air to a conduit of the flow assembly to move the agricultural product within the flow assembly to the product tank.

9. The system of claim 8, wherein the pressurized air provided to the conduit is exhausted through an overflow duct fluidly coupled with the product tank.

10. A method for operation of a product system for an agricultural sprayer, the method comprising:
    determining one or more characteristics of an agricultural product, wherein at least a portion of the agricultural product is positioned within a flow assembly fluidly coupled with a product tank; and
    activating a reclaim system for a first defined time period to move the agricultural product within the flow assembly to the product tank based on the one or more characteristics of the agricultural product.

11. The method of claim 10, wherein activating for the reclaim system for the first defined time period to move the agricultural product within the flow assembly to the product tank based on the one or more characteristics of the agricultural product further comprises generating the first defined time period based on one or more look-up tables associated with the one or more characteristics of the agricultural product.

12. The method of claim 10, wherein determining the one or more characteristics of the agricultural product further comprises detecting the one or more characteristics through a flow path sensor.

13. The method of claim 12, wherein determining the one or more characteristics of the agricultural product further comprises receiving the one or more characteristics from a user interface.

14. The method of claim 10, further comprising:
  detecting a volume of the agricultural product within the flow assembly after the first defined time period.

15. The method of claim 14, further comprising:
  activating a reclaim system for a second defined time period to move the agricultural product within the flow assembly to the product tank based on the one or more characteristics of the agricultural product.

16. A product system for an agricultural sprayer, the system comprising:
  a product tank configured to store an agricultural product;
  a flow assembly configured to direct the agricultural product into the product tank during a fill mode;
  a sensor configured to detect a characteristic of the agricultural product;
  a reclaim system configured to provide the agricultural product within the flow assembly to the product tank during a reclaim mode; and
  a computing system communicatively coupled to the sensor, the computing system being configured to alter a predefined pressure provided by the reclaim system to the flow assembly during a reclaim mode based on the characteristic of the agricultural product.

17. The system of claim 16, wherein the characteristic of the agricultural product includes at least one of a density, a volume, a viscosity, or a temperature of the agricultural product.

18. The system of claim 17, wherein the computing system is communicatively coupled to the reclaim system, the computing system further configured to receive, through a user interface, inputs indicative of the characteristic of the agricultural product.

19. The system of claim 17, wherein the computing system is further configured to compare the characteristic to a look-up table and determine the predefined pressure based on the look-up table.

20. The system of claim 17, wherein the computing system is configured to determine an amount of the agricultural product moved from the flow assembly to the product tank during the reclaim mode and initiate a subsequent fill mode if the volume exceeds a residual threshold.

* * * * *